(12) United States Patent
Inoue

(10) Patent No.: US 9,308,806 B2
(45) Date of Patent: Apr. 12, 2016

(54) ACTIVE VIBRATION REDUCTION DEVICE

(71) Applicant: HONDA MOTOR CO., LTD., Tokyo (JP)

(72) Inventor: Toshio Inoue, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 124 days.

(21) Appl. No.: 14/380,200

(22) PCT Filed: Feb. 22, 2013

(86) PCT No.: PCT/JP2013/054494
§ 371 (c)(1),
(2) Date: Aug. 21, 2014

(87) PCT Pub. No.: WO2013/125677
PCT Pub. Date: Aug. 29, 2013

(65) Prior Publication Data
US 2015/0001773 A1    Jan. 1, 2015

(30) Foreign Application Priority Data

Feb. 24, 2012   (JP) ................................. 2012-038301

(51) Int. Cl.
*F16F 7/10* (2006.01)
*B60K 5/12* (2006.01)
(Continued)

(52) U.S. Cl.
CPC .............. *B60K 5/1283* (2013.01); *B60K 5/1241* (2013.01); *F16F 7/1011* (2013.01); *F16F 15/022* (2013.01); *B60K 5/04* (2013.01); *B60K 5/1216* (2013.01)

(58) Field of Classification Search
CPC ........... F16F 15/002; F16F 15/02; F16F 7/10; F16F 7/1005; F16F 7/1011; F16F 7/1028; B60K 5/1283; B60K 5/1241
See application file for complete search history.

(56) References Cited

U.S. PATENT DOCUMENTS

| 4,610,420 A | * | 9/1986 | Fukushima | ........... F16F 13/262 |
| | | | | 180/300 |
| 8,827,250 B2 | * | 9/2014 | Satou | .................... F16F 7/1011 |
| | | | | 267/140.11 |
| 2012/0098177 A1 | | 4/2012 | Satou et al. | |

(Continued)

FOREIGN PATENT DOCUMENTS

| JP | 61-220926 | 10/1986 |
| JP | 04-254216 | 9/1992 |

(Continued)

OTHER PUBLICATIONS

International Search Report, Date of mailing: May 14, 2013.

*Primary Examiner* — Nicholas J Lane
(74) *Attorney, Agent, or Firm* — Rankin, Hill & Clark LLP

(57) ABSTRACT

The reference signal generating unit corrects the simulated vibration transmission characteristic from the offset vibration generating unit to the acceleration sensor using one of the correction tables switched corresponding to the static torque of the engine estimated by the static torque estimating unit out of the stored content of the correction table storing unit to generate control signals. The vibration transmitted from the engine to the side of the vehicle body can be surely reduced by offset vibration generated by the control signals at the offset vibration generating unit even in an essentially rigidly supporting status.

4 Claims, 14 Drawing Sheets

(51) Int. Cl.
*F16F 15/02* (2006.01)
*B60K 5/04* (2006.01)

(56) References Cited

U.S. PATENT DOCUMENTS

2013/0328254 A1* 12/2013 Kojima ............... B60K 5/1241
267/140.15

2015/0204406 A1* 7/2015 Yoon ..................... F16F 6/005
248/562

FOREIGN PATENT DOCUMENTS

| JP | 05-061485 | 3/1993 |
| JP | 06-004144 | 1/1994 |
| JP | 2009-226967 | 10/2009 |
| JP | 2011-012757 | 1/2011 |

* cited by examiner

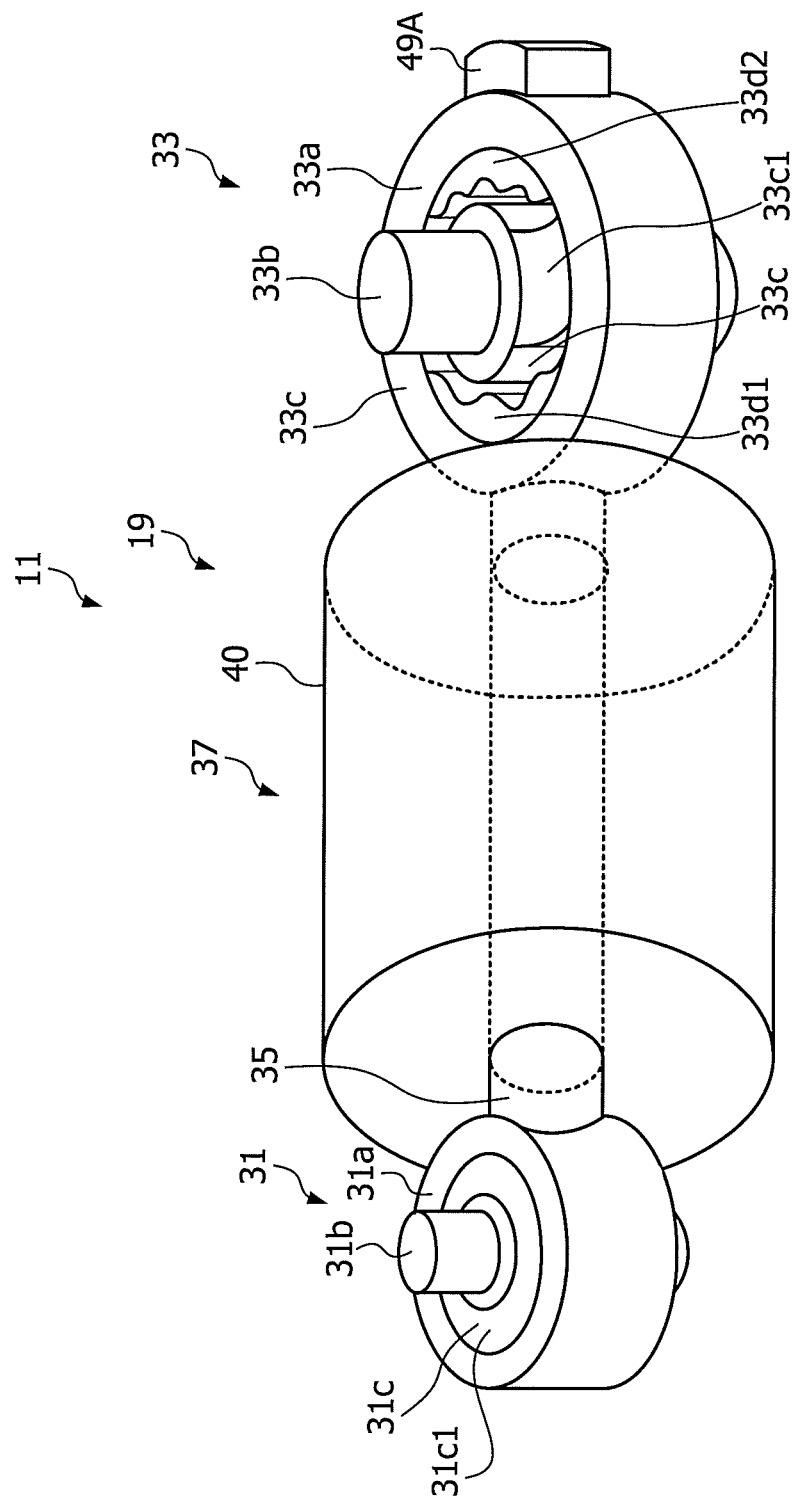

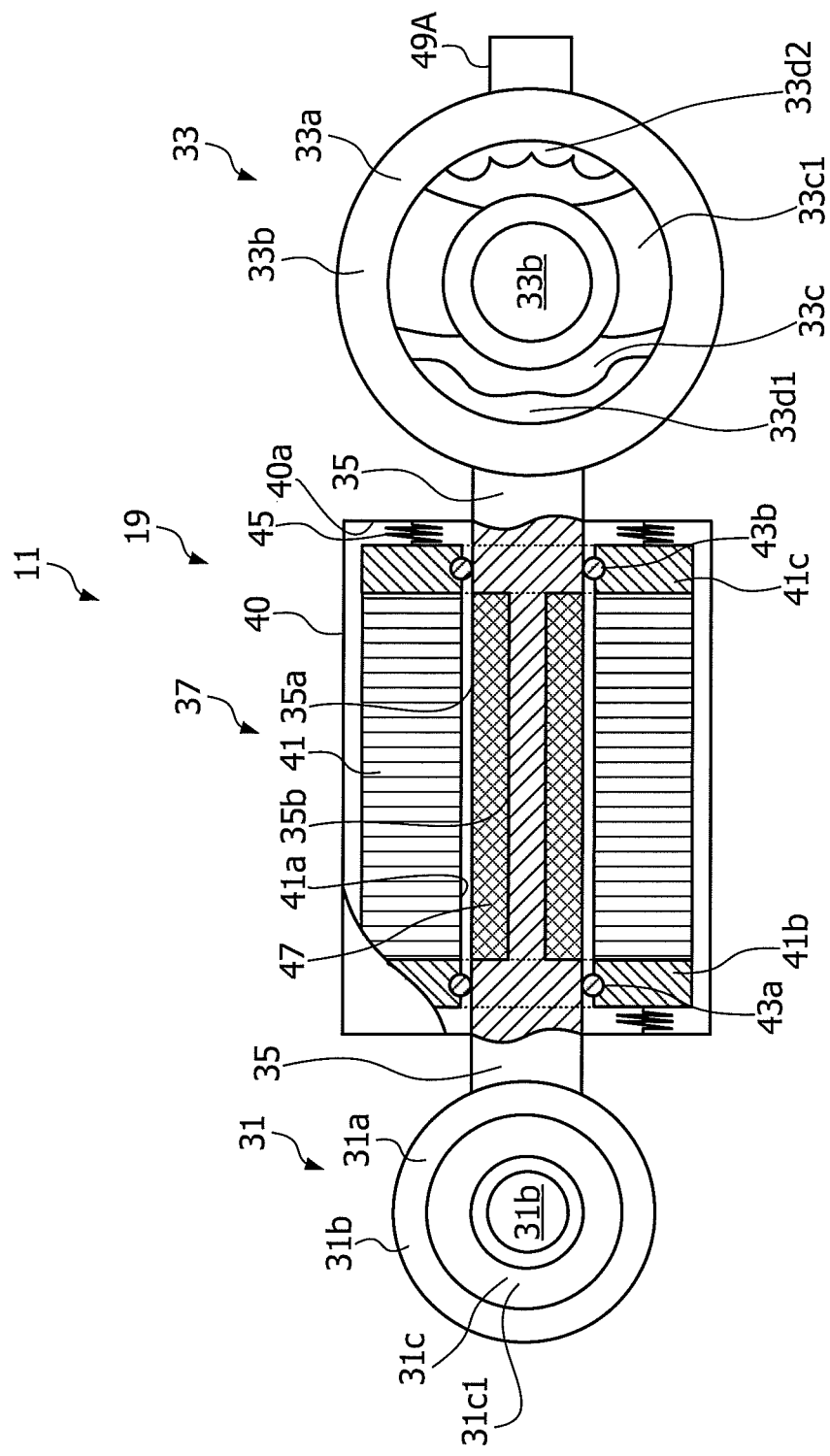

ACTIVE VIBRATION REDUCTION DEVICE

TECHNICAL FIELD

The present invention relates to an active vibration reduction device for actively reducing vibrations transmitted from the engine to the vehicle body side.

BACKGROUND ART

Conventionally, to reduce vibrations transmitted from the engine to the vehicle body side, there is a technology in which an engine is elastically supported through members called a torque rod which includes insulators and a rod part relative to the vehicle body side. Further, an active vibration reduction device for actively reducing vibrations from the engine to the body side by cancelling the vibrations of the engine by an antiphase vibrations of an inertial mass to increase the vibration reduction effect with the torque rod by providing an actuator for generating at an inertial mass vibrations which is antiphase with the vibrations of the engine (for example, see FIG. 2 in Patent Document 1).

More specifically, the active vibration reduction device of Patent Document 1 includes an engine-side insulator to be mounted on the side of the engine and the torque rod having a rod part for connecting these a pair of the insulators, an inertial mass supported by the rod part, an actuator for reciprocatingly drive the inertial mass in an axial direction of the rod part, and a control means for controlling the reciprocating drive of the inertia mass in the axial direction of the rod part.

Provided inside a body side cylindrical hollow member forming a frame of the vehicle body side insulator are body-side shaft members having a circular column in a coaxial circles. The body side shaft member is mounted on the vehicle body side. In a vehicle body space having a ring shape sectioned by an inner circumferential wall of the vehicle body side cylindrical hollow member and an outer circumferential wall of the vehicle body side shaft member is filled at a high density with an elastic member such as rubber. This provides an elastic support through an elastic member between the vehicle body side shaft member and the vehicle body side cylindrical hollow member.

On the other hand, provided inside the engine side cylindrical hollow member forming the frame of the engine side insulator are engine side shaft members in a cylindrical column shape coaxially. The engine side shaft members are mounted on the engine side. Provide inside the engine side space in a ring shape defined by the inner circumferential wall of the engine side cylindrical hollow member and an outer circumferential wall of the engine side shaft member are engine side elastic members which partially extends in a direction orthogonal with the shaft direction of the rod part.

Further, there is no elastic member at a part along the shaft direction of the rod part out of the ring-shape engine side space. Instead of this, a pair of stoppers including elastic members such as rubber, etc. are installed at an inner circumferential wall part of the hollow cylindrical member extending along an axial direction of the rod part out of the ring-shape engine side space. A pair of the stoppers restrict a movable range of the engine side shaft member extending along an axial direction of the rod part, i.e., a displacement of the power plant including the engine and the transmission. This prevents interference between the engine, the vehicle body, or accessories and provides a role of increasing a durability performance of the engine.

This configuration provides an elastic support between the engine side shaft member and the engine side hollow cylindrical member through the engine side elastic member installed so as to partially extend in a direction orthogonal with an axial direction of the rod part.

The active vibration reduction device of Patent Document 1 can reduce the vibrations transmitted from the engine to the vehicle body side.

PRIOR ART PATENT DOCUMENT

Patent Document 1: JP 2011-12757 A

SUMMARY OF INVENTION

Problem to be Solved by Invention

However, in the active vibration reduction device of Patent Document 1, for example, when a driving torque (hereinafter referred to as "static torque") of the engine exceeds a predetermined value, for example, upon acceleration at start of travelling of the vehicle or passing, the engine side shaft member is displaced by load caused by the static torque toward the stopper installed at the inner circumferential part of the engine side hollow cylindrical member in the axial direction of the rod part, and comes abutting against the stopper. If the displacement characteristic of the engine side shaft member in the axial direction of the rod part regarding the load caused by the static torque in this case is estimated, the displacement characteristic curve of the engine side shaft member bends in a shape of "<" at a border when the engine side shaft member abuts on the stopper.

In summary, when the engine side shaft member abuts on the stopper, the supporting relation between the engine side shaft member and the engine side hollow cylindrical member changes from the elastic support to an essentially rigid support. When a torque variation (hereinafter referred to as "dynamic torque") caused by the combustion variation of the engine occurs in the essentially rigid supporting status, the dynamic torque is directly applied to the vehicle body side through the engine side shaft member, the stopper, the engine side hollow cylindrical member, the rod part, the vehicle side hollow cylindrical member, the vehicle body side elastic member, and the vehicle side shaft member. This decreases an effect of reducing the vibrations transmitted from the engine to the vehicle body side.

The present invention is achieved in consideration of the circumstance and aims to provide an active vibration reduction device capable of surely decreasing the vibration transmitted from the engine to the vehicle body side even in the substantially rigid supporting status in which the a shaft member of the torque rod abuts the stopper of the hollow cylindrical member.

Means for Solving Problem

To achieve the above-described aim, the present invention defined by claim 1 mainly features an active vibration reduction device reducing vibrations from the engine to a side of a vehicle body, comprising:

a torque rod elastically supporting an engine relative to the side of the vehicle body, the torque rod including a pair of insulators and a rod part; and an inertial mass supported movably reciprocatively relative to the rod part along an axial direction of the rod part;

wherein the pair of the insulators include shaft members, disposed inside hollow cylindrical members, attached to a side of the engine and the side of the vehicle body, respectively, the shaft members being elastically supported by the hollow cylindrical members; and wherein at least one of the pair of the insulators includes a stopper at an inner circumferential wall of the hollow cylindrical member, the stopper restricting a displacement of the shaft member in the axial direction of the rod part;

the active vibration reduction device further comprising:

a basic signal generating unit generating a basic signal correlating with a vibration frequency based on rotation speed information of the engine;

a control signal generating unit generating a control signal to reduce the vibrations transmitted to the side of the vehicle body from the engine by performing an adaptive process acting a filter coefficient of an adaptive filter on the basic signal;

an offset vibration generating unit generating offset vibrations at the inertia mass based on the control signal;

an error signal detecting unit for detecting an error signal regarding an error between the vibrations of the engine and the offset vibrations;

a reference signal generating unit generating a reference signal obtained by correcting the basic signal on the basis of a simulated vibration transmission characteristic from the offset vibration generating unit to the error signal detecting unit;

a filter coefficient updating unit updating the filter coefficient of the adaptive filter on the basis of the error signal and the reference signal;

a static torque estimating unit estimating a static torque of the engine on the basis of the rotational speed information and load information of the engine; and a correction table storing unit storing correction tables of the simulated vibration transmission characteristics corresponding to a plurality of different value regions of the vibration frequencies with association with a plurality of different value regions of the static torque of the engine; wherein the reference signal generating unit generates the reference signal using the simulated vibration transmission characteristic obtained on the basis of the static torque of the engine estimated by the static torque estimating unit, a stored content of the correction table storing unit, and the simulated vibration transmission characteristic obtained based on the vibration frequency.

According to the vibration reduction device defined by claim 1, the reference signal generating unit uses in a switching manner one of the correction tables corresponding to the static torque of the engine estimated by the static torque estimating unit out of the stored contents of the correction table storing unit to correct the simulated vibration transmission characteristic from the offset vibration generating unit to the error signal detecting unit and generates the reference signal using the corrected simulated vibration transmission characteristic. This suppresses such an erroneous chain that an erroneous reference signal is generated using an erroneous simulated vibration transmission characteristic. Accordingly, even in such the substantially rigidly supporting status where the shaft member of the torque rod abuts the stopper of the hollow cylindrical member, the vibrations transmitted from the engine to the side of the vehicle body can be surely reduced.

The present invention defined by claim 1 mainly features an active vibration reduction device reducing vibrations from the engine to a side of a vehicle body, comprising:

a torque rod elastically supporting an engine relative to the side of the vehicle body, the torque rod including a pair of insulators and a rod part; and an inertial mass supported movably reciprocatively relative to the rod part along an axial direction of the rod part; wherein the pair of the insulators include shaft members, disposed inside hollow cylindrical members, attached to a side of the engine and the side of the vehicle body, respectively, the shaft members being elastically supported by the hollow cylindrical members; and wherein at least one of the pair of the insulators includes a stopper at an inner circumferential wall of the hollow cylindrical member, the stopper restricting a displacement of the shaft member in the axial direction of the rod part;

the active vibration reduction device further comprising:

a basic signal generating unit generating a basic signal correlating with a vibration frequency based on rotation speed information of the engine;

a control signal generating unit generating a control signal to reduce the vibrations transmitted to the side of the vehicle body from the engine by performing an adaptive process acting a filter coefficient of an adaptive filter on the basic signal;

an offset vibration generating unit generating offset vibrations at the inertia mass based on the control signal;

an error signal detecting unit for detecting an error signal regarding an error between the vibrations of the engine and the offset vibrations; a reference signal generating unit generating a reference signal obtained by correcting the basic signal on the basis of a simulated vibration transmission characteristic from the offset vibration generating unit to the error signal detecting unit; a filter coefficient updating unit updating the filter coefficient of the adaptive filter on the basis of the error signal and the reference signal;

a correction table storing unit storing correction tables of the simulated vibration transmission characteristics corresponding to a plurality of different value regions of the vibration frequencies with association with a plurality of different value regions of the load of the shaft member on the stopper; wherein the stopper includes a load detecting unit for detecting a load of the shaft member on the stopper; and wherein the reference signal generating unit generates the reference signal using the load of the shaft member on the stopper detected by the load detecting unit, a stored content of the correction table storing unit, and the vibration frequency.

Accordingly, the active vibration reduction device defined by claim 2 provides the adaptive control function which is preferable in, for example, the case of a vehicle in such a circumference that the rotation speed information and load information of the engine for estimating the static torque of the engine cannot be obtained and the case in which it is necessary to introduce the active vibration reduction device at a low cost.

Further, the active vibration reduction device defined by claim 3 provides the active vibration reduction device defined by claim 1, wherein the inertia mass is supported movably reciprocatively relative to the rod part along an axial direction of the rod part using a ball bearing mechanism intervening between the inertia mass and the rod part.

Further, the active vibration reduction device defined by claim 4 provides the active vibration reduction device defined by claim 2, wherein the inertia mass is supported movably reciprocatively relative to the rod part along an axial direction of the rod part using a ball bearing mechanism intervening between the inertia mass and the rod part.

According to the vibration reduction devices defined by claim 3 or 4, because almost no fustigation and damages in the ball bearing mechanism caused by entrance of vibration regarding a radiation direction of the rod part occurs, the durability can be remarkably enhanced.

Advantageous Effect of Invention

According to the vibration reduction device, the vibrations transmitted from the engine to the side of the vehicle body can be surely reduced even in such an essentially rigidly supporting status that the shaft member of the torque rod abuts the stopper of the hollow cylindrical member.

BRIEF DESCRIPTION OF DRAWINGS

FIG. 2A is a perspective view illustrating an exterior appearance of a torque rod.

FIG. 2B is an explanation drawing including a top view of the torque rod in FIG. 2A and a cross section view of a part cut away from the torque rod.

MODES FOR CARRYING OUT INVENTION

First to third embodiments of the active vibration reduction device will be described with reference to FIGS. 1 to 3.
[General Configuration of an Active Vibration Reduction Device 11 of the Present Invention]

Figure 1A:
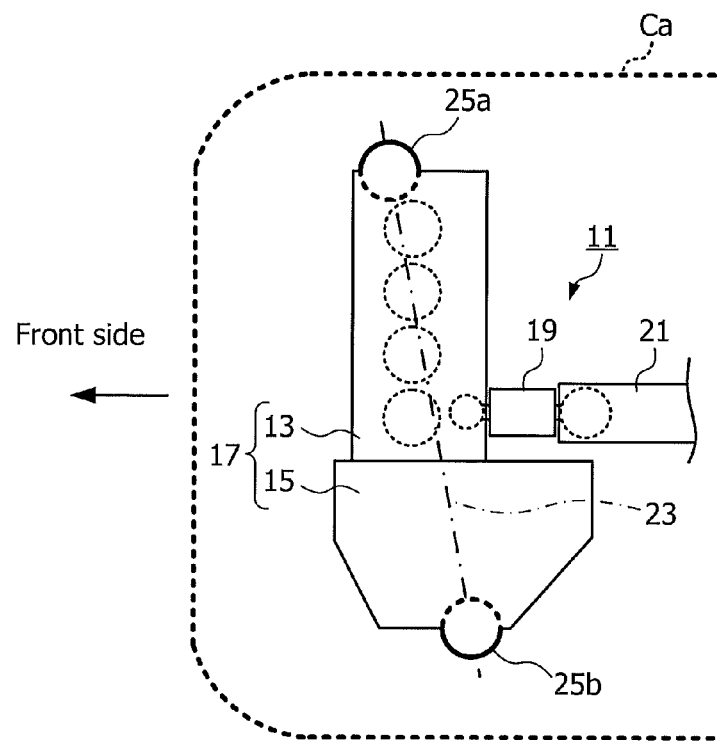
FIG. 1A is a plan view conceptually illustrating a positional relation between a power plant including an engine and a transmission of a vehicle and a torque rod, being an engine mount device with a pendulum system.

First, the general configuration of a vehicle to which the active vibration reduction device 11 is applied will be described with reference to FIGS. 1A and 1B. FIG. 1A is a plan view conceptually illustrates a positional relation between a power plant 17 and a torque rod 19, the power plant 17 including an engine 13 and a transmission 15 in a vehicle Ca, the torque rod 19 being an engine mount device of the pendulum system and FIG. 1B is a side view conceptually illustrating a positional relation shown in FIG. 1A.

The active vibration reduction device 11 according to the present invention includes the torque rod 19 for actively reducing the vibrations transmitted to a side of a vehicle body 21 from the engine 13 as shown in FIG. 1A. The engine 13 is a transverse engine in which a crank shaft (not shown) is arranged in a vehicle width direction. A left side on FIG. 1A corresponds to a front side of the vehicle Ca.

In the description below, common functional members are designated with a common reference as a general rule, and a duplicated description is omitted. Further, in a case where it is necessary to describe the functional members regarding the active vibration reduction devices 11A, 11B, 11C of the first to third embodiments distinguishably, a reference "A" is added to an end of the reference of the functional members regarding the active vibration reduction device 11A in the first embodiment, a reference "B" is added to an end of the reference of the functional members regarding the active vibration reduction device 11B in the second embodiment, and a reference "C" is added to an end of the reference of the functional members regarding the active vibration reduction device 11C in the third embodiment.

Figure 1B:
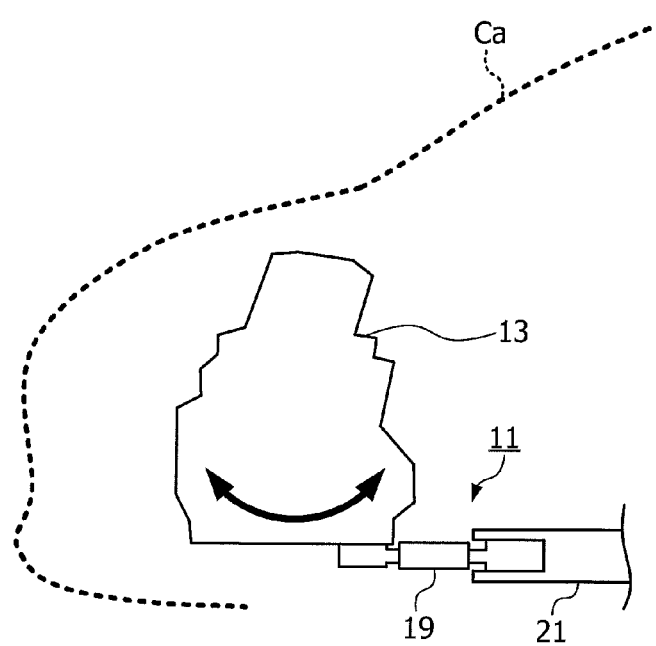
FIG. 1B is a side view conceptually illustrating a positional relation in FIG. 1A.

The engine 13 is, as shown in FIG. 1A, elastically supported by a pair of mount members 25a, 25b arranged on a roll axis 23, which is a principal axis of inertia of the whole of the power plant 17, so as to able to revolve around the roll axis 23 of inertia main axis like a pendulum (see FIG. 1B). To restrict a displacement regarding a pendulum movement of the engine 13, a rear side of the engine 13 is elastically supported by a side of the vehicle body 21 through the torque rod 19 as shown in FIGS. 1A and 1B. Accordingly, a configuration for receiving by the torque rod 19 a torque reaction force due to a driving torque of the engine 13 is adopted.

The torque rod 19 has functions to enhance a durability performance of the engine 13 in addition to preventing interference of the engine 13 with the vehicle body 21 and accessories and the like (not shown) by suppressing the displacement of the engine 13 by restricting the reaction force of the driving torque. Further, the torque rod 19 has a function for maintaining comfort of environment within a vehicle cabin by reducing transmission of vibrations caused by torque variations caused by combustion fluctuations of the engine 13.

[General Configuration of the Torque Rod 19]

Next a general configuration of the torque rod 19 included in the active vibration reduction device 11 according to the present invention will be described with reference to FIGS. 2A and 2B. FIG. 2A is a perspective view illustrating an exterior of the torque rod 19. FIG. 2B is an illustration showing a top view of the torque rod 19 in FIG. 2A together with a cross section in which a part of the torque rod 19 is cut away.

The torque rod 19 included in the active vibration reduction device 11 according to the present invention includes, as shown in FIGS. 2A and 2B, a pair of first and second insulators 31, 32, a rod member 35, and an offset vibration generating unit 37.

The first insulator 31 includes a first shaft member 31b mounted on a side of the engine 13 inside a first hollow cylindrical member 31a. In a first space 31c in a ring shape defined by the inner circumferential wall of the first hollow cylindrical member 31a and an outer circumferential wall of the first shaft member 31b is filled thick with a first elastic member 31c1 having elasticity such as rubber, etc. This provides an elastic support between the first hollow cylindrical member 31a and the first shaft member 31b through a first elastic member 31c1.

On the other hand, the second insulator 33 having a larger diameter than the first insulator 31 has a second shaft member 33b mounted on a side of the vehicle body 21 inside a second hollow cylindrical member 33a. In a second space 33c in a ring shape defined by the inner circumferential wall of the second hollow cylindrical member 33a and an outer circumferential wall of the second shaft member 33b is filled with a second elastic member 33c1, having elasticity such as rubber, the second elastic member 33c1 being partially provided to extend in a direction orthogonal with an axial direction of the rod member 35. This provides elastic support between the second hollow cylindrical member 33a and the second shaft member 33b through the second elastic member 33c1.

In addition, at a part out of the second space 33c in a ring shape, the part extending along an axial direction of the rod member 35, of the second space 33c, the second elastic member 33c1 is not provided. Instead, at an inner circumferential wall part of the second hollow cylindrical member 33a extending along an axial direction of the rod member 35 out of the second space 33c in the ring shape, a pair of a first and second stoppers 33d1, 33d2 made of a third elastic member having elasticity such as a rubber, etc. are provided.

The first stopper 33d1 is set to have an elastic coefficient greater than that of the second stopper 33d2 as described later. These a pair of the stoppers 33d1, 33d2 perform a role of restricting a movable region of the second shaft member 33b extending along the axial direction of the rod member 35, i.e., a role of restricting a displacement of the power plant 17 including the engine 13 and the transmission 15.

The offset vibration generating unit 37 includes, as shown in FIGS. 2A and 2B, an inertia mass 41 and a linear actuator 47 in a case 40 having an exterior shape which is a pillar-post shape.

The inertia mass 41 including a ferromagnetic body such as metals has an inner circumferential wall member 41a as shown in FIGS. 2A and 2B. The inertia mass 41 is provided to have a thin gap with the outer circumferential wall member 35a of the rod member 35 coaxially with the rod member 35 such that the inner circumferential wall member 41a surrounds a circumference of the rod member 35 in a column. A gravity center of the inertia mass 41 agrees with a gravity center of a rod member 35.

Provided at the both end parts 41b, 41c of the inertia mass 41 extending along an axial direction of the rod member 35 are ball bearing mechanisms 43a, 43b. The ball bearing mechanisms 43a, 43b perform roles of allowing reciprocation movement of the inertia mass 41 along the axial direction of the rod member 35 while a gap between the inertia mass 41 and the rod part is maintained. In addition, provided between each of the both end parts 41b, 41c of the inertia mass 41 and a side wall 40a of a case 40 along an axial direction of the rod member 35 is an elastic member 45 such as a spring side wall 40a. Accordingly, the inertia mass 41 is configured to be able to freely reciprocate along an axial direction of the rod member 35 and has such a configuration that an inertia force of the inertia mass 41 is transmitted to the case 40 through the elastic member 45.

Provided on the rod member 35 facing the inner circumferential wall member 41a of the inertia mass 41 are circumferential channels 35b. The channel 35b of the rod member 35 houses the linear actuator 47. At a position of the rod member 35 facing the inner circumferential wall member 41a of the inertia mass 41, an outer circumferential surface of the linear actuator 47 forms the outer circumferential wall member 35a of the elastic member 45.

The linear actuator 47 is, for example, of a linear motion type and fixed to the channel 35b of the rod member 35 and includes a core (not shown) which is made by laminating magnetic steel sheets, each having a thin plate shape, a coil (not shown) wound around the core, and a permanent magnet (not shown) arranged at an outer circumferential surface of the coil. The linear actuator 47 has a function for movably reciprocatively driving the inertia mass 41 along an axial direction of the rod member 35 in accordance with the magnetic field generated by the coil and the permanent magnet by allowing a current regarding a control signal mentioned later to flow toward the coil.

Provided to the second insulator 33 is an acceleration sensor 49A for detecting an acceleration of the second insulator 33 itself. The acceleration sensor 49A corresponds to "error signal detecting unit" of the present invention.

[Arrangement of Problems Regarding the Present Invention]

Figure 3A:
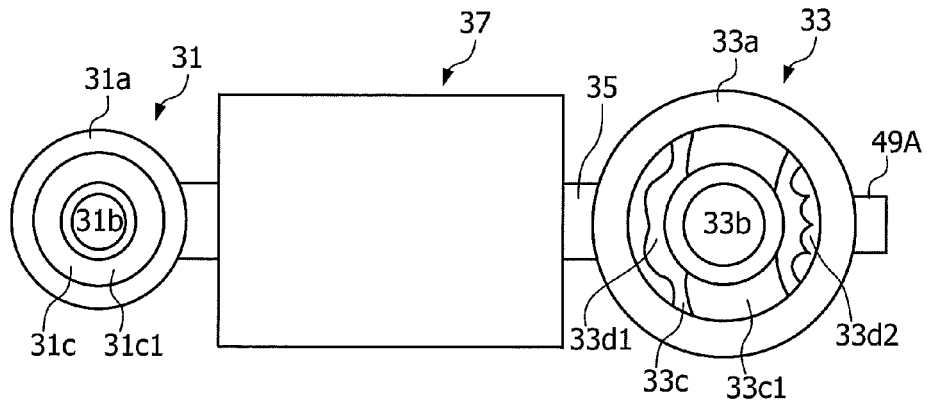
FIG. 3A is an explanation drawing illustrating a behavior of a second insulator when a current relating to a basic signal (correlating with a vibration frequency based on engine rotation speed information) is caused to flow through a coil of a linear actuator in a case where a static torque on the torque rod is small.
Figure 3B:
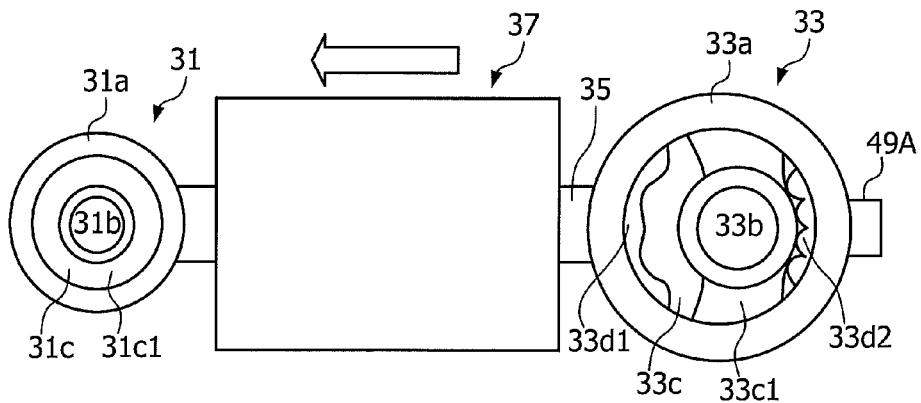
FIG. 3B is an explanation drawing illustrating the behavior of the second insulator when the current relating to the basic signal is caused to flow through the coil of the linear actuator in a case where the static torque on the torque rod is large (upon decelerating the vehicle).
Figure 3C:
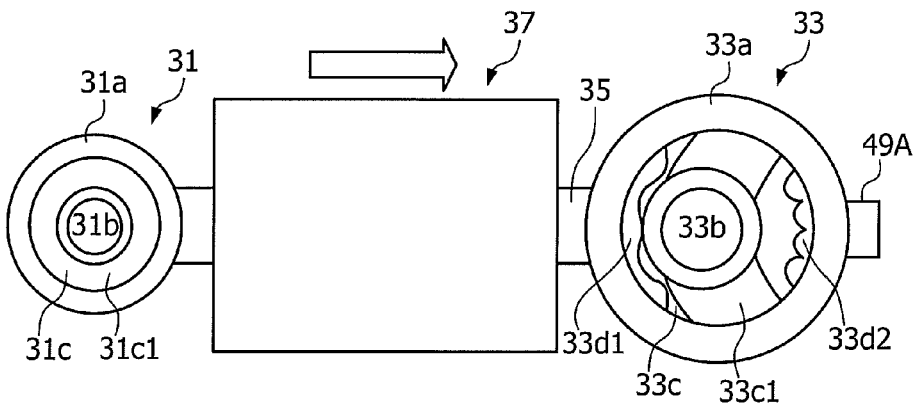
FIG. 3C is an explanation drawing illustrating the behavior of the second insulator when the current relating to the basic signal is caused to flow through the coil of the linear actuator in a case where the static torque on the torque rod is large (upon decelerating the vehicle).
Figure 4:
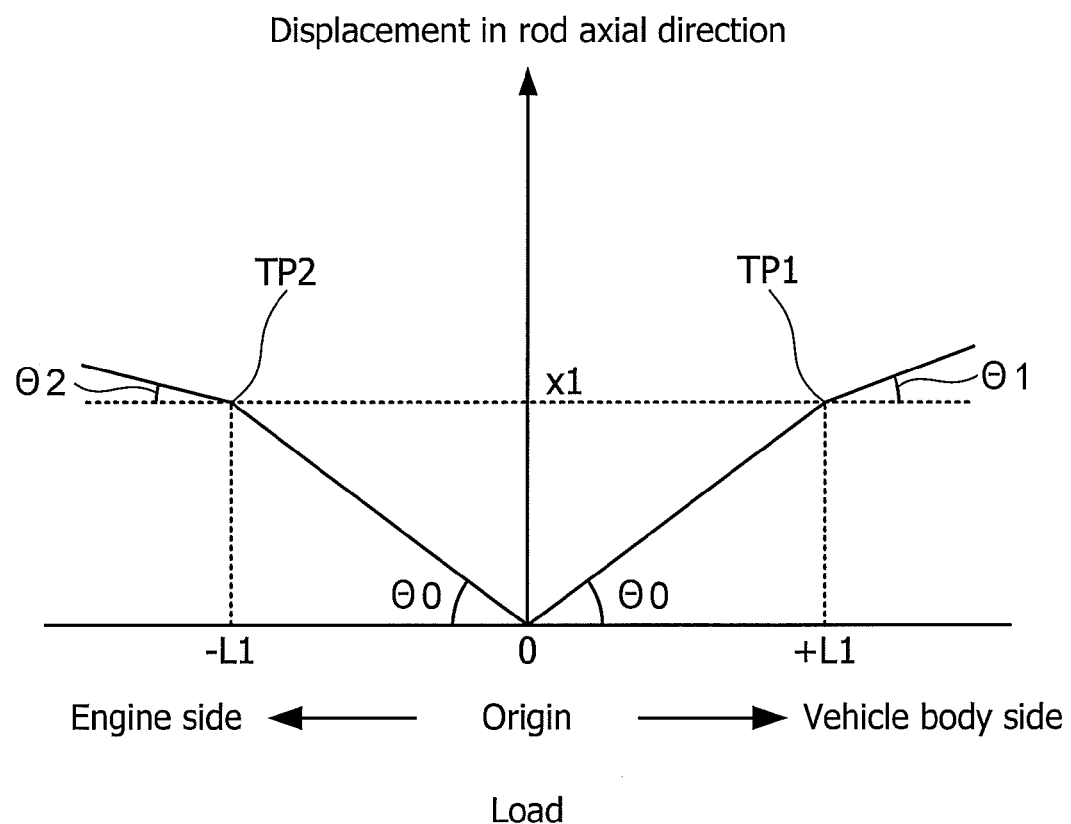
FIG. 4 is a chart illustrating a displacement characteristic of the second shaft member in an axial direction of the rod part with respect of a load generated in the torque rod caused by the static torque.

With reference to FIGS. 3A to 3C, and 4, arrangement of problems regarding the present invention will be described. FIG. 3A is an illustration for showing behavior of the second insulator 33 when a current regarding a basic signal (correlating with a vibration frequency based on rotational speed information of the engine) is caused to flow through the coil of the linear actuator 47 in a case where a static torque received by the torque rod 19 is small. FIGS. 3B and 3C are illustrations showing behavior of the second insulator 33 when the current relating to the basic signal is caused to flow through the coil of the linear actuator 47 in a case where the static torque received by the torque rod 19 is large (during acceleration of the vehicle Ca or deceleration of the vehicle Ca). FIG. 4 is a chart showing a displacement characteristic of the second shaft member 33b in an axial direction of the rod member 35 against a load on the torque rod 19 caused by the static torque.

When the current regarding the basic signal is caused to flow through the coil of the linear actuator 47, as shown in FIG. 3A in a case where the static torque received by the torque rod 19 is small, as shown in FIG. 3A, in the second insulator 33, the second shaft member 33b shows such a behavior that the second shaft member 33b exists at a middle position between the first stopper 33d1 and the second stopper 33*d*2. A value of the load based on the static torque in this condition is within a range of the region regarding −L1 to +L1. In the displacement characteristic curve chart with respect to the load results in straight lines having angle of θ0 as shown in FIG. 4.

In summary, within a region from −L1 to +L1 shown in FIG. 4, a simulated vibration transmission characteristic from the offset vibration generating unit 37 to the acceleration sensor 49A (error signal detecting unit) keeps a substantially linear characteristic.

On the other hand, when the current regarding the basic signal flowing through the coil of the linear actuator 47 in a case where the static torque received by the torque rod 19 exceeds by a predetermined value (when the load in FIG. 4 is large in a positive direction) (for example, upon acceleration of the vehicle Ca), the second shaft member 33*b* behaves in the second insulator 33 as shown in FIG. 3B so as to abut the second stopper 33*d*2. A value of the load based on the static torque exists in a region over +L1 in FIG. 4. The displacement characteristic curve with respect to the load changes to decrease in inclination θ0 to θ1 at a boarder of a displacement x1 regarding a displacement point TP1 as shown in FIG. 4 and becomes non-linear.

In summary, the simulated vibration transmission characteristic of a part from the offset vibration generating unit 37 to the acceleration sensor 49A (error signal detecting unit) changes from linear to non-linear at a boarder at a displacement x1 at the displacement point TP1.

Further, in a case where the static torque received by the torque rod 19 is larger than a predetermined value (the load in FIG. 4 is large in a negative direction) (upon, for example, decelerating of the vehicle Ca), when a current regarding the basic signal is caused to flow through the coil of the linear actuator 47, as shown in FIG. 3C, in the second insulator 33, the second shaft member 33*b* behaves in the second insulator 33 as shown in FIG. 3C to abut the first stopper 33*d*1. At this instance, a value of the load based on the static torque exists in a region under −L1 shown in FIG. 4. The displacement characteristic curve with respect to the load becomes, as shown in FIG. 4, non-linear in which an inclination θ0 largely decreases to θ2 at a displacement of x1 regarding displacement point TP2 and becomes non-linear.

In summary, the simulated vibration transmission characteristic of a part from the offset vibration generating unit 37 to the acceleration sensor 49A (error signal detecting unit) changes from linear to non-linear at the boarder at a displacement x1 regarding a displacement point TP2.

In summary, when the second shaft member 33*b* abuts either of the first stopper 33*d*1, or the second stopper 33*d*2, a supporting relation between the second shaft member 33*b* and the simulated vibration transmission characteristic changes from the elastic supporting to a substantially rigidly supporting. In the state of the substantially rigid supporting, when the torque variation (dynamic torque) caused by combustion variation of the engine occurs, the dynamic torque is directly applied to the side of the vehicle body 21. Accordingly, there may be decrease in an effect of reducing the vibrations transmitted from the engine 13 to the side of the vehicle body 21.

Particularly, in a variable cylinder engine for increased fuel efficiency, a turbo engine in which a torque is increased by a supercharger, etc., there may be remarkable decrease in conformability of travelling environment because in the substantially rigid supporting state in which the engine-side shaft member abuts the stopper of the engine side hollow cylindrical member, when the dynamic torque is directly inputted into the vehicle body side, booming noises occur in the vehicle cabin, so that the vibrations that provide vibration feeling to the driver through a steering wheel, and a an accelerator pedal.

[Outline of the Active Vibration Reduction Device 11 According to the Present Invention]

The active vibration reduction device 11 according to the present invention adopts the following configuration:

A reference signal generating unit uses in a switching manner one of correction tables corresponding to the static torques of the engine estimated by a static torque estimating unit out of stored contents in the correction table storing unit to correct the simulated vibration transmission characteristic of a part extending from the offset vibration generating unit to an error signal detecting unit, and the reference signal is generated using the simulated vibration transmission characteristic after the correction. This can suppress an error chain in which an error reference signal is generated using an erroneous simulated vibration transmission characteristic.

According to the active vibration reduction device 11 of the present invention can maintain the preferable travelling environment by decreasing the vibration transmitted from the engine 13 to the side of the vehicle body 21 even in the substantially rigid supporting state in which the second shaft member 33*b* of the engine 13 abuts the stoppers 33*d*1, 33*d*2 of the second hollow cylindrical member 33*a*.

[General Configuration of the Active Vibration Reduction Device 11A According to the First Embodiment of the Present Invention]

Next, a general configuration of the active vibration reduction device 11A according to the first embodiment of the present invention will be described with reference to FIGS. 5A, 5B, and 6.

Figure 5A:
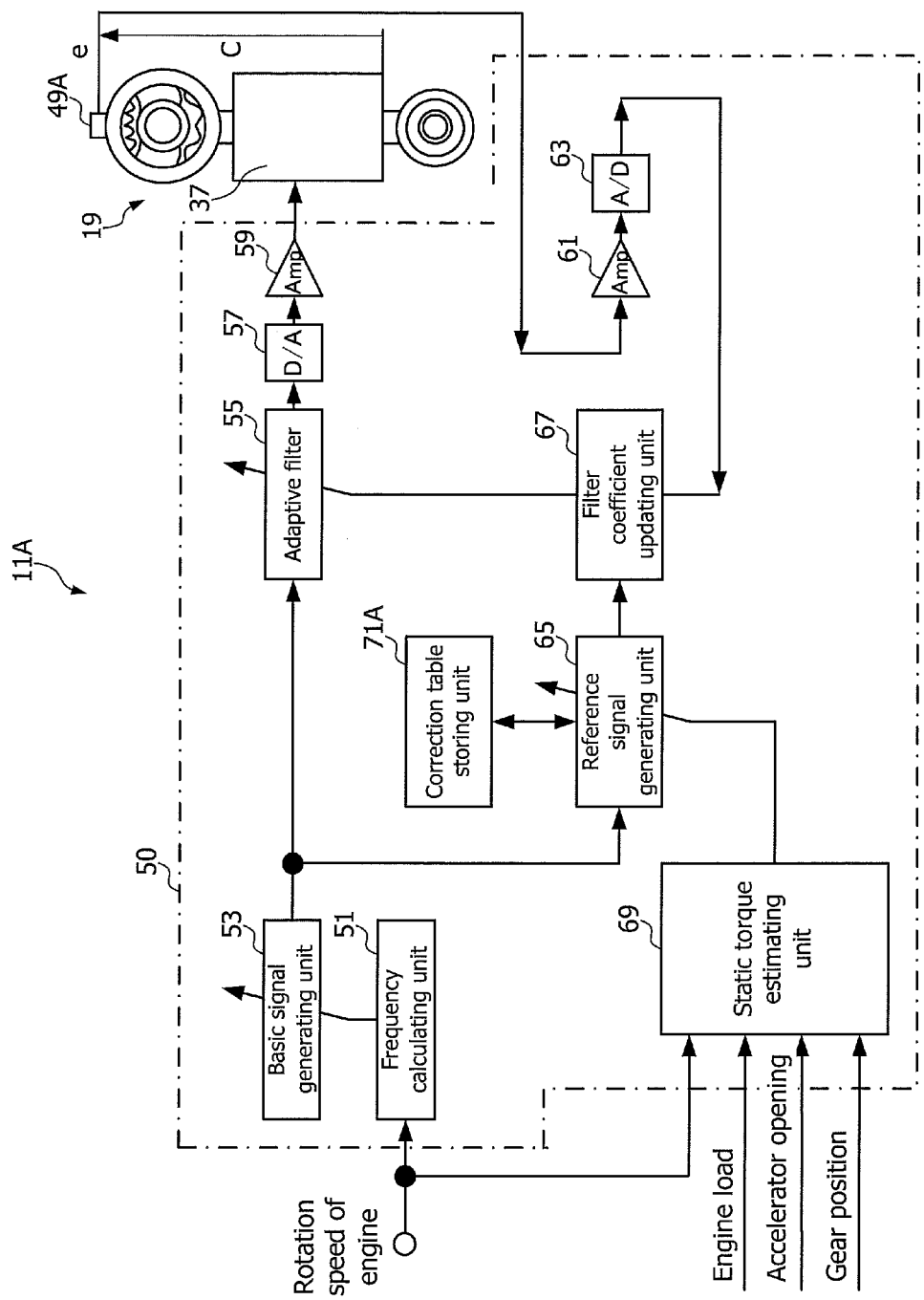
FIG. 5A is a block diagram illustrating a general configuration of the active vibration reduction device according to the first embodiment of the present invention.

FIG. 5A is a block diagram illustrating a general configuration of the active vibration reduction device 11A according to the first embodiment of the present invention. FIG. 5B is a block diagram illustrating an internal configuration of each part in the active vibration reduction device 11A according to the first embodiment of the present invention. FIG. 6 is an illustration showing a three-dimensional correction table stored in a correction table storing unit 71A.

Figure 5B:
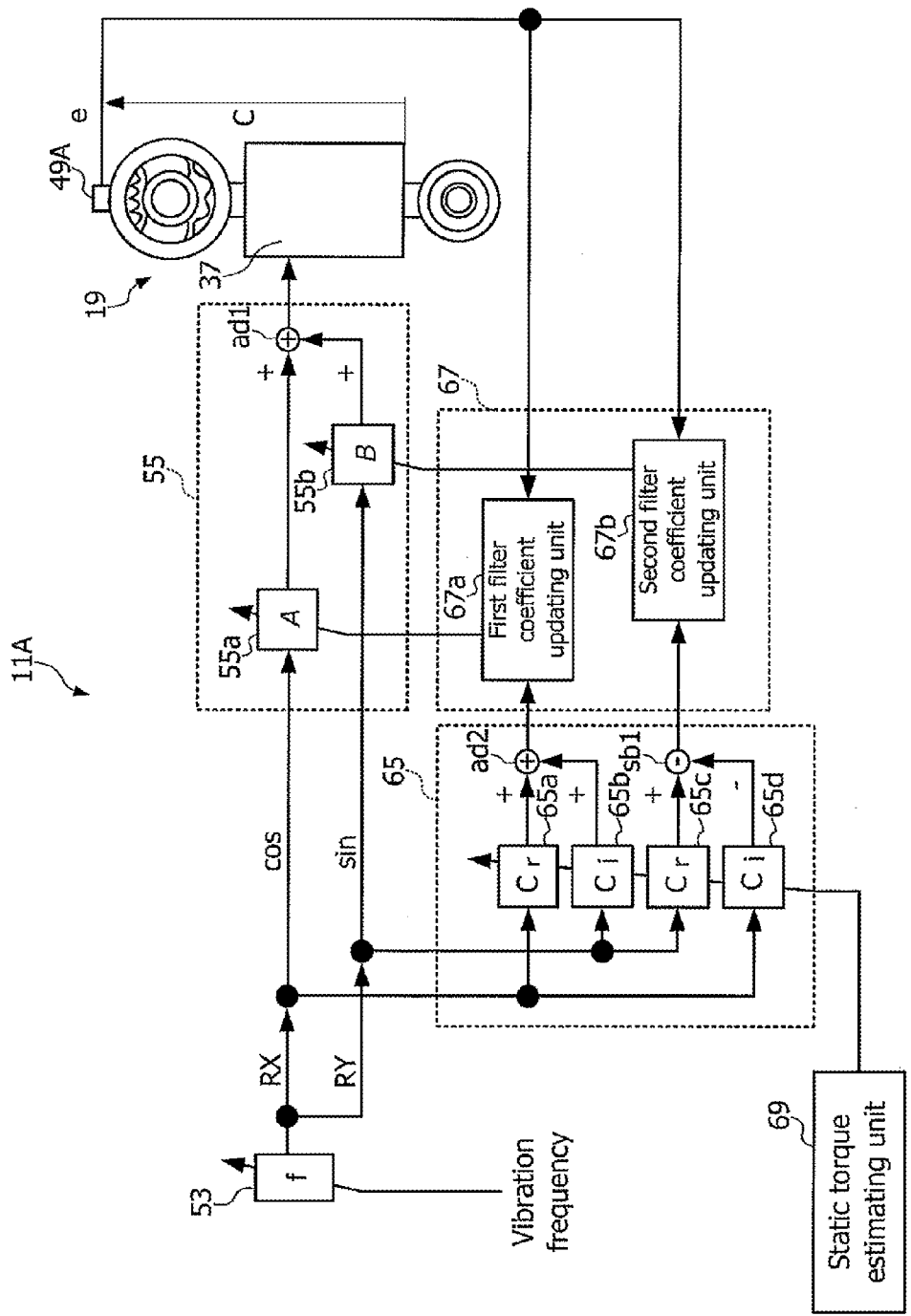
FIG. 5B is a block diagram illustrating an internal configuration of each part in the active vibration reduction device according to the first embodiment of the present invention.

In FIG. 5B, out of a plurality of functional units that the active vibration reduction device 11A has, descriptions about a frequency calculating unit 51, a D/A converting unit 57, a signal amplifying unit 59, a signal amplifying unit 61, an A/D converting unit 63, and the correction table storing unit 71A are omitted.

The active vibration reduction device 11A according to the first embodiment of the present invention includes, as shown in FIG. 5A, the frequency calculating unit 51, a basic signal generating unit 53, an adaptive filter 55, the D/A converting unit 57, the signal amplifying unit 59, the torque rod 19 including the offset vibration generating unit 37, the acceleration sensor 49A, a signal amplifying unit 61, the A/D converting unit 63, a reference signal generating unit 65, a filter coefficient updating unit 67, a static torque estimating unit 69, and the correction table storing unit 71A.

Further, each of the functional units such as the frequency calculating unit 51, the basic signal generating unit 53, the adaptive filter 55, the D/A converting unit 57, the signal amplifying unit 59, the signal amplifying unit 61, the A/D converting unit 63, the reference signal generating unit 65, the filter coefficient updating unit 67, the static torque estimating unit 69, and the correction table storing unit 71A are embodied with a microcomputer 50 including a CPU(Central Processing Unit), a ROM (Read Only Memory), a RAM (Random Access Memory), etc. The microcomputer 50 reads out a program stored in the ROM to execute the program to have the function for executing control of each of the functional units.

The frequency calculating unit 51 shown in FIG. 5A has a function for calculating a vibration frequency on the basis of rotation speed information of the engine 13.

To cause the adaptive control to track a rapid variation in the rotation speed of the engine 13, an analog tacho-pulse signal is applicable which does not cause delay in rotation speed information of an engine.

The basic signal generating unit 53 shown in FIGS. 5A and 5B has a function for generating a basic signal correlating with the vibration frequency calculated by the frequency calculating unit 51. The basic signal in the basic signal generating unit 53 is, as shown in FIG. 5B, generated as a cosine wave signal RX and a sine wave signal RY.

The adaptive filter 55 corresponding to the "control signal generating unit" according to the present invention has, as shown in FIGS. 5A and 5B, a function for generating a control signal to reduce the vibrations transmitted from the engine 13 to the side of the vehicle body 21 by performing an adaptive process for causing action of filter coefficients A, B upon the basic signals RX, RY generated by the basic signal generating unit 53. As the adaptive filter 55, for example, an adaptive notch filter or an FIR filter is usable appropriately.

More specifically, the adaptive filter 55 includes, as shown in FIG. 5B, a first adaptive filter 55a having a filter coefficient A and a second adaptive filter 55b having a filter coefficient B, and an adder unit ad1. The first adaptive filter 55a has functions for inputting the cosine wave signal RX out of the basic signals generated by the basic signal generating unit 53, multiplying the cosine wave signal RX by the filter coefficient A, and outputting the obtained first control signal (A×Rx). The second adaptive filter 55b has functions for inputting the sine wave signal RY out of the basic signals generated by the basic signal generating unit 53, multiplying the sine wave signal RY by the filter coefficient B, and outputting the obtained second control signal (B×Ry). The adder unit ad1 has a function for adding the first control signal (A×RX) and the second control signal (B×RY) and outputting the result, i.e., a third control signal (A×RX)+(B×RY).

The D/A converting unit 57 shown in FIG. 5A has a function for converting the third control signal (A×RX)+(B×RY), which is a digital signal, into an analog signal.

The signal amplifying unit 59 shown in FIG. 5A has a function for amplifying the third control signal (A×RX)+(B×RY) which was converted into the analog signal by the D/A converting unit 57 to have a predetermined value of gain.

The offset vibration generating unit 37 shown in FIGS. 5A and 5B has a function for generating offset vibrations based on the third control signal (A×RX)+(B×RY) at the inertia mass 41.

The acceleration sensor 49A corresponding to "error signal detecting unit" according to the present invention has, as shown in FIGS. 5A and 5B, a function for detecting an error signal e regarding an error of the vibrations of the engine 13 and the offset vibrations generated by the offset vibration generating unit 37.

Further, a symbol "C" shown in FIGS. 5A and 5B represents in the torque rod 19 the simulated vibration transmission characteristic of a part extending from the offset vibration generating unit 37 to the acceleration sensor 49A.

The signal amplifying unit 61 shown in FIG. 5A has a function for amplifying a gain of the error signal detected by the acceleration sensor 49A to have a predetermined value.

The A/D converting unit 63 shown in FIG. 5A has a function for converting the error signal e amplified by the signal amplifying unit 61 into a digital signal.

The reference signal generating unit 65 shown in FIGS. 5A and 5B has a function for generating the reference signal resulting from correction by the basic signals RX, RY on the basis of the estimation value $\hat{C}$ of the simulated vibration transmission characteristic from the offset vibration generating unit 37 to the acceleration sensor 49A ($\hat{C}$ representing an estimated value of the simulated vibration transmission characteristic C). Here, the estimation value $\hat{C}$ of the simulated vibration transmission characteristic includes, as shown in FIG. 5B, a real part of the simulated vibration characteristic Cr, and an imaginary part of the simulated vibration transmission characteristic Ci.

More specifically, the reference signal generating unit 65 generates a function for generating the reference signals resulting from correction of the basic signals RX, RY using the statistic torque of the engine 13 estimated by the static torque estimating unit 69 described later, the stored contents of the correction table storing unit 71A described later, and the estimation value $\hat{C}$ of the simulated vibration transmission characteristic obtained based on the vibration frequency.

To provide the functions, a reference signal generating unit 65 includes, as shown in FIG. 5B, first and third correcting filters 65a, 65c having the simulated vibration transmission characteristic Cr as a real part, and the second and fourth correcting filters 65b, 65d having the simulated vibration transmission characteristic Ci as an imaginary part, an adder unit ad2, and a subtraction unit sb1.

The first correcting filter 65a has functions for inputting the cosine wave signal RX out of the basic signals generated by the basic signal generating unit 53 and outputting the first reference signal (Cr×RX) which is obtained by multiplying the cosine wave signal RX by the real part filter coefficient Cr. The second correcting filter 65b has functions for inputting out of the basic signals generated by the basic signal generating unit 53 the sine wave signal RY and outputting a second reference signal (Ci×RY) obtained by multiplying the sine wave signal RY by the imaginary part filter coefficient Ci.

Figure 6:
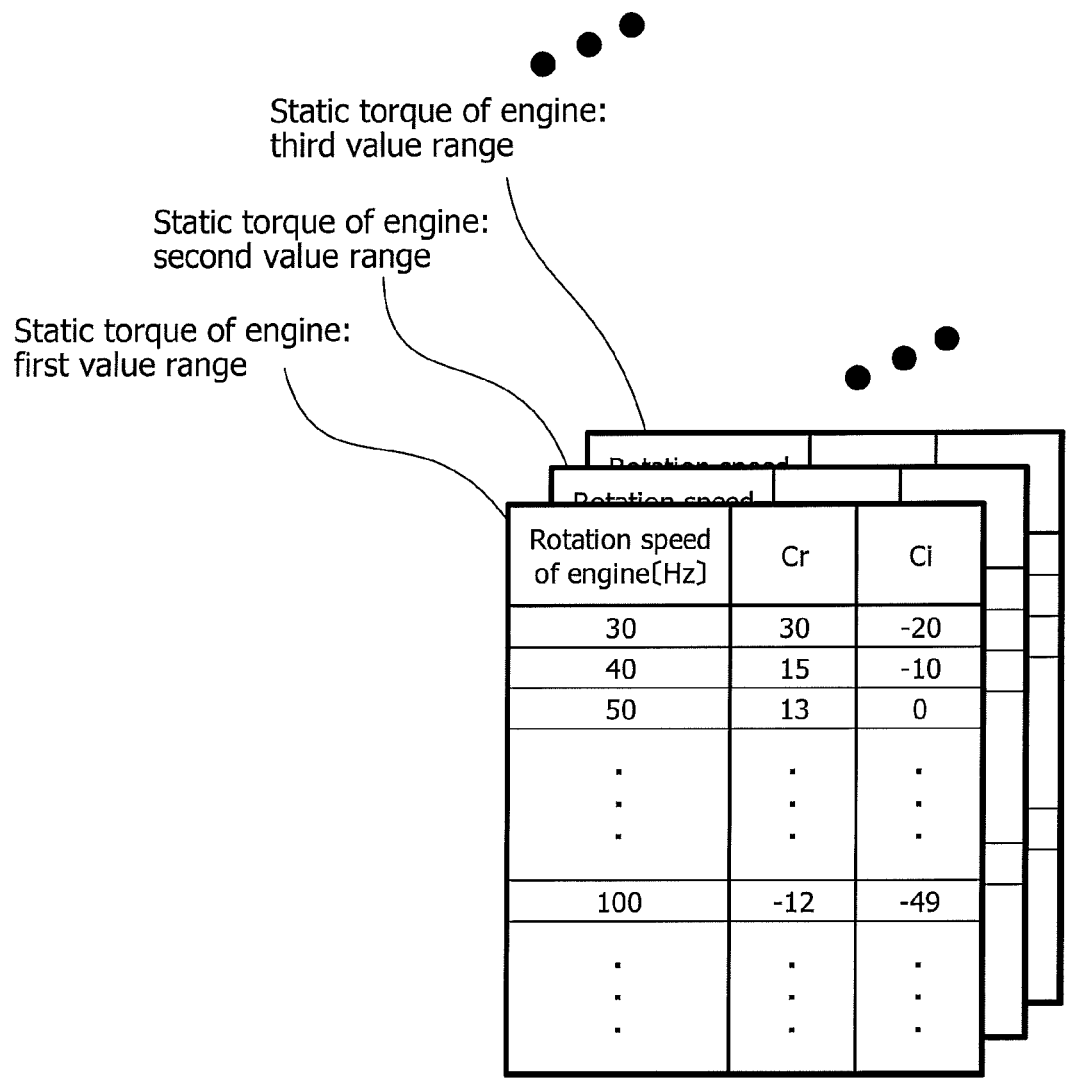
FIG. 6 is an illustration showing an example of a three-dimensional correction table stored in a correction table storing unit according to the first embodiment.

As the simulated vibration characteristic Cr, for example, as shown in FIG. 6, different values are set for a plurality of value range of the engine rotational frequency f, respectively. Similarly, as an imaginary part filter coefficient Ci, for example, as shown in FIG. 6, different values are set for the value ranges of the engine rotation frequency f, respectively. In summary, the real part filter coefficient Cr and the imaginary part filter coefficient Ci can be expressed as a function (Cr(f)/Ci(f)) of which parameter is an engine rotation frequency f as shown in, for example, FIG. 6. Then, in the descriptions below, the real part filter coefficient Cr is expressed as Cr (f) and the imaginary part filter coefficient Ci may be expressed as Ci (f).

A third correcting filter 65c has functions for inputting the sine wave signal RY out of the basic signals generated by the basic signal generating unit 53 and outputting a third reference signal (Cr×RY) obtained by multiplying the sine wave signal RY by the real part filter coefficient Cr. A fourth correcting filter 65d has functions for inputting the cosine wave signal RX out of the basic signals generated by the basic signal generating unit 53 and outputting a fourth reference signal (Ci×RX) obtained by multiplying the cosine wave signal RX by the imaginary part filter coefficient Ci.

The adder unit ad2 has a function for adding the first reference signal (Cr×RX) and the second reference signal (Ci×RY) and outputting a result of a fifth reference signal (Cr×RX)+(Ci×RY).

The subtraction unit sb1 has functions for subtracting the fourth reference signal (Ci×RX) from the third reference signal (Cr×RY) and outputting a resulting sixth reference signal (Cr×RY)+(Ci×RX).

The filter coefficient updating unit 67 shown in FIGS. 5A and 5B has a function for updating the filter coefficient of the adaptive filter 55 on the basis of the error signal e and the reference signal. More specifically, the filter coefficient updating unit 67 uses the reference signal after correction by the reference signal generating unit 65 and updates the filter coefficient of the adaptive filter 55 on the basis of the calculation formula of the LMS (Least Mean Square) which is an adaptive control algorism for performing an adaptive process to minimize the error signal e.

More specifically, the filter coefficient updating unit 67 includes, as shown in FIG. 5B, a first filter coefficient updating unit 67a having the first adaptive algorithm and a second filter coefficient updating unit 67b having a second adaptive algorithm. For the first and second adaptive algorithms, for example, the LMS are preferably usable.

The first filter coefficient updating unit 67a has a function for updating the filter coefficient A of the first adaptive filter 55a by performing an operation after substitution of the error signal e and the fifth reference signal (Cr×RX)+(Ci×RY) generated by the reference signal generating unit 65 in the calculation formula for LMS (see Equation 1 below).

$$A_{n+1}=A_n-\mu \times e \times \{Cr(f) \times RX+Ci(f) \times RY\}$$ (Eq. 1)

Here μ is called Step Size Parameter (Step Size Parameter) which is a parameter for determining a size of updating by one operation in the adaptive filter 55, and e is an error signal.

The second filter coefficient updating unit 67b has a function for updating the filter coefficient B of the second adaptive filter 55b by performing substitution of the error signal e and the sixth reference signal (Cr×RY)−(Ci×RX) generated by the reference signal generating unit 65 in the calculation formula for LMS (see Equation 2 below) and operation.

$$B_{n+1}=B_n-\mu \times e \times \{Cr(f) \times RY-Ci(f) \times RX\}$$ (Eq. 2)

Further, an updating frequency of the filter coefficients A, B in the adaptive filter 55 can be set to about 3000 cycles/sec.

The static torque estimating unit 69 shown in FIGS. 5A and 5B has a function for estimating a static torque of the engine 13 on the basis of rotational speed information, load information, accelerator opening information, gear position information, etc. of the engine 13. The static torque estimating unit 69 can estimate the static torque of the engine 13 with at least the rotation speed information and the load information. The accelerator opening information, the gear position information, etc. can be used as an assist when it is necessary to increase an estimating accuracy regarding the static torque of the engine 13.

The correction table storing unit 71A shown in FIG. 5A has a function for storing correction tables regarding the simulated vibration transmission characteristics corresponding to a plurality of value regions of different vibration frequencies, respectively, with correlation with a plurality of different value regions of the static torque of the engine 13 as shown in FIG. 6.

In addition, the three-dimensional correction table as shown in FIG. 6 can be set through experiments or simulations (including the combination of the experiments and simulations) for each type of vehicles or each grade of vehicles.

More specifically, for example, when the three-dimensional correction table is experimentally set, using an actual vehicle for measurement, in a state in which the static torque of the engine 13 is set to a first value region, for each of a plurality of different value range of the vibration frequency, the corresponding simulated vibration characteristic Cr, Ci is measured. When the measurement regarding the first value range of the static torque of the engine 13 has finished, in a state in which the static torque of the engine 13 is set to a second value region different from the first value region of the static torque of the engine 13, for each of a plurality of different value range of the vibration frequency, the corresponding simulated vibration characteristic Cr, Ci is measured. Similarly, when the measurement regarding the second value range of the static torque of the engine 13 has finished, in a state in which the static torque of the engine 13 is set to a third value region different from the first and second value regions of the static torque of the engine 13, for each of a plurality of different value range of the vibration frequency, the corresponding simulated vibration characteristic Cr, Ci is measured. After that, through a similar process, the three-dimensional correction table is set by obtaining the correction tables through an actual measurement of the simulated vibrations transmission characteristics Cr, Ci corresponding to a plurality of value ranges of different vibration frequencies, respectively, with correlation with a plurality of different value regions of the static torque of the engine 13. However, in setting the three-dimensional table, in place of, or in addition to, the experimental process, a process using simulation may be used.

[Operation of the Active Vibration Reduction Device 11A According to the First Embodiment of the Present Invention]

Next, an operation of the active vibration reduction device 11A according to the first embodiment of the present invention will be described.

The frequency calculating unit 51 calculates the vibration frequency on the basis of the rotation speed information of the engine 13. The basic signal generating unit 53 generates the cosine wave signal RX and the sine wave signal RY as the basic signals correlating with the vibration frequency calculated by the frequency calculating unit 51.

The adaptive filter 55 generates a control signal for reducing the vibrations transmitted to the side of the vehicle body 21 from the engine 13 by performing adaptive process to act coefficients A, B on the basic signals (the cosine wave signal RX and the sine wave signal RY) generated by the basic signal generating unit 53.

More specifically, in the adaptive filter 55, the first adaptive filter 55a inputs the cosine wave signal RX out of the basic signals generated by the basic signal generating unit 53 and outputs the first control signal (A×RX) obtained by multiplying the cosine wave signal RX by the filter coefficient A. In the second adaptive filter 55b inputs the sine wave signal RY out of the basic signals generated by the basic signal generating unit 53 and outputs the second control signal (B×RY) obtained by multiplying the sine wave signal RY by the coefficient B. The adder unit ad1 adds the first control signal (A×RX) and the second control signal (B×RY) and outputs a third control signal (A×RX)+(B×RY) obtained as an addition result. Accordingly, the third control signal (A×RX)+(B×RY) is generated in the adaptive filter 55.

After the third control signal (A×RX)+(B×RY), which is a digital signal generated by the adaptive filter 55, is converted into an analog signal by the D/A converting unit 57, the signal amplifying unit 59 amplifies the control signal to have a predetermined value of the gain and supplied to the offset vibration generating unit 37. In response to this, an offset vibration generating unit 37 generates a cancelling vibration based on the control signal at the inertia mass 41.

The acceleration sensor 49A detects the error signal e which is an interference result of the vibration of the engine 13 with the offset vibration generated by the offset vibration generating unit 37. The error signal e detected by the acceleration sensor 49A is amplified by the signal amplifying unit 61 to have a gain of the error signal e at a predetermined value and, after that, is converted into a digital signal by the A/D converting unit 63, the digital signal being fed back to the filter coefficient updating unit 67.

The reference signal generating unit 65 generates the reference signal using the simulated vibration transmission characteristic $\hat{C}$ obtained on the basis of the static torque of the engine 13 estimated by the static torque estimating unit 69, stored contents of the correction table storing unit 71A, and the vibration frequency. More specifically, the reference signal generating unit 65 generates the reference signal through correcting the basic signals RX, RY on the basis of the simulated vibration transmission characteristic $\hat{C}$ obtained by the process described above.

More specifically, in the reference signal generating unit 65, the first correcting filter 65a inputs the cosine wave signal RX out of the basic signals generated by the basic signal generating unit 53 and outputs the first reference signal (Cr×RX) obtained by multiplying the cosine wave signal RX by a real number filter coefficient Cr. The second correction filter 65b inputs the sine wave signal RY out of the basic signals generated by the basic signal generating unit 53 and outputs the second reference signal (Ci×RY) obtained by multiplying the sine wave signal RY by an imaginary part filter coefficient Ci.

Further, in the reference signal generating unit 65, the third correcting filter 65c inputs the sine wave signal RY out of the basic signals generated by the basic signal generating unit 53 and outputs the third reference signal (Cr×RY) obtained by multiplying the sine wave signal RY by the real number filter coefficient Cr. The fourth correcting filter 65d inputs the cosine wave signal RX out of the basic signals generated by the basic signal generating unit 53 and outputs the fourth reference signal (Ci×RX) obtained by multiplying the cosine wave signal RX by the imaginary part filter coefficient Ci.

Further in the reference signal generating unit 65, the adder unit ad2 outputs a fifth reference signal (Cr×RX)+(Ci×RY) obtained by adding the first reference signal (Cr×RX) and the second reference signal (Ci×RY). Further the subtraction unit sb1 outputs the sixth reference signal (Cr×RY)−(Ci×RX) obtained by subtracting the fourth reference signal (Ci×RX) from the third reference signal (Cr×RY). Accordingly, the reference signal generating unit 65 generates the fifth reference signal (Cr×RX)+(Ci×RY) and the sixth reference signal (Cr×RY)−(Ci×RX).

The filter coefficient updating unit 67 updates the filter coefficients A, B of the adaptive filter 55 on the basis of the error signal e detected by the acceleration sensor 49A, the reference signals (fifth reference signal (Cr×RX)+(Ci×RY)) and the sixth reference signal (Cr×RY)−(Ci×RX)) generated by the reference signal generating unit 65, respectively. More specifically, using the reference signals after correction by the reference signal generating unit 65 (fifth reference signal (Cr×RX) +(Ci×RY) and the sixth reference signal (Cr×RY)−(Ci×RX), the filter coefficient updating unit 67 updates the filter coefficients A, B of the adaptive filter 55 on the basis of the calculation formulas (see Eq. (1) and Eq. (2)) of LMS (Least Mean Square), which is an adaptive control algorithm of an adaptive process to make the error signal e minimum using the reference signal.

[Operational Effect of the Active Vibration Reduction Device 11A Regarding the First Embodiment of the Present Invention]

Figure 7A:
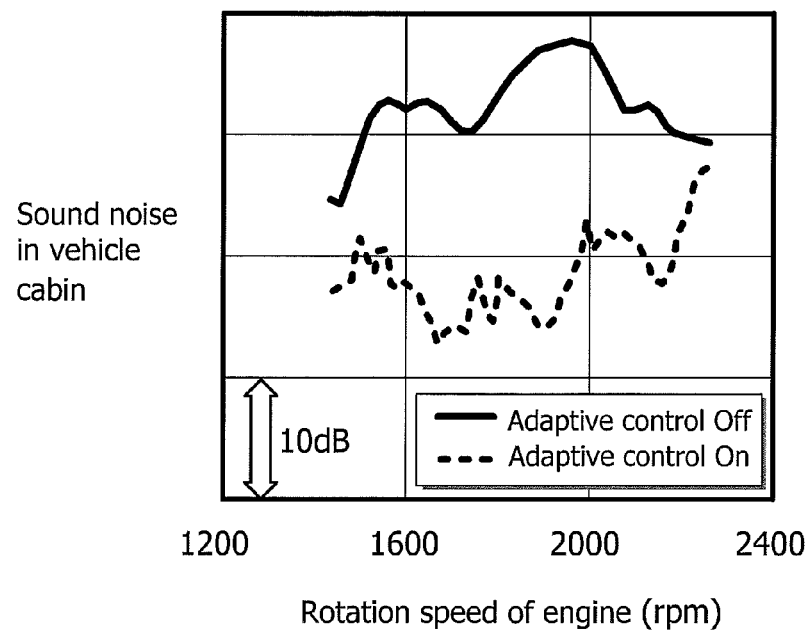
FIG. 7A is a chart illustrating dynamic damping effects (vehicle interior noise) with respect to a fundamental component of adaptive control according to the first embodiment when the rotation speed of the engine is changed for comparatively illustrating between turning on of the adaptive control and turning off of the adaptive control.
Figure 7B:
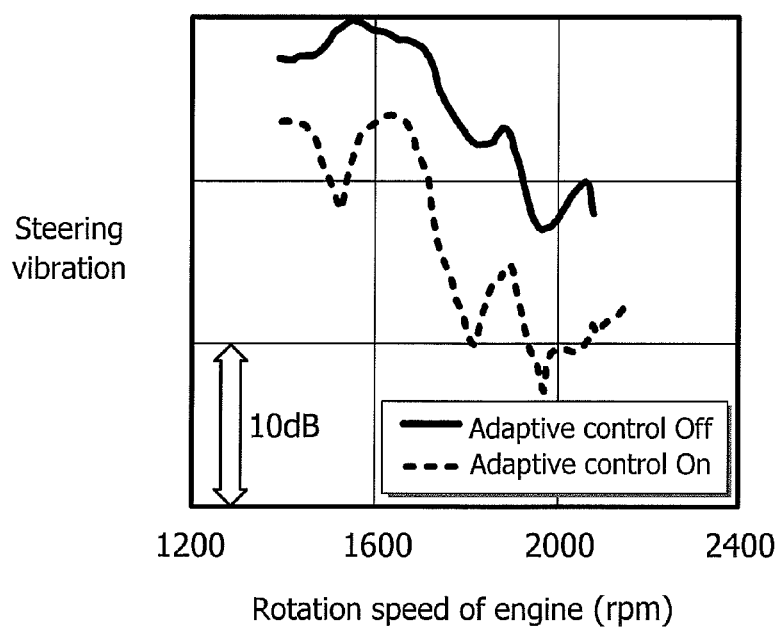
FIG. 7B is a chart for comparing the vibration reduction effect in a case where an adaptive control is turned on with that in another case where the adaptive control is turned off.

Next, operational effect of the active vibration reduction device 11A regarding the first embodiment of the present invention will be described with reference FIGS. 7A and 7B. FIG. 7A is a chart illustrating a damping effect (vehicle interior noise) with respect to a fundamental component of adaptive control according to the first embodiment when the rotation speed of the engine 13 is changed, through comparison between turning on of the adaptive control and turning off of the adaptive control. FIG. 7B is a chart illustrating a damping effect (steering vibration) with respect to the adaptive control according to the first embodiment when the rotation speed of the engine 13 is changed, through comparison between turning on of the adaptive control and turning off of the adaptive control.

In the active vibration reduction device 11A regarding the first embodiment of the present invention, the following configuration is adopted.

The reference signal generating unit 65 generates the reference signals (fifth reference signal (Cr×RX)+(Ci×RY), and the sixth reference signal (Cr×RY)−(Ci×RX) using the simulated vibration transmission characteristic after correction which is derived by correcting the simulated vibration transmission characteristic Cr, Ci on a path from the offset vibration generating unit 37 to the acceleration sensor 49A by using in a switching manner one of correction tables corresponding to the static torque of the engine 13 estimated by the static torque estimating unit 69 obtained from the stored content of the correction table storing unit 71A. This suppresses such an erroneous chain that use of a wrong simulated vibration transmission characteristic generates a wrong reference signal.

Accordingly, even in the substantially rigidly supporting state in which the second shaft member 33b of the engine 13 abuts the stoppers 33d1, 33d2 of the second hollow cylindrical member 33a, the active vibration reduction device 11A of the first embodiment of the present invention reduces the vibrations transmitted to the engine 13 to the side of the vehicle body 21. This suppresses the unpleasant noise in the vehicle cabin and steering vibrations (see FIGS. 7A and 7B) and maintains the comfortable travelling circumstance.

Further, in the active vibration reduction device 11A according to the first embodiment of the present invention, the structure is adopted which supports the inertia mass 41 to allow reciprocating movements in the axial direction of the rod member 35 relative to the rod member 35 using the ball bearing mechanisms 43a, 43b intervened between the inertia mass 41 and the rod member 35.

The active vibration reduction device 11A according to the first embodiment of the present invention can remarkably enhance durability thereof because fatigue or damages of the ball bearing mechanism 43a, 43b caused by the vibration entrance regarding a radiation direction of the rod member 35 provides almost no fatigue and damage in the ball bearing mechanisms 43a, 43b as compared with the comparative example having a swingy support along the axial direction of the rod member 35 relative to the rod member 35 using a plate spring (not shown) intervened between the inertia mass 41 and the rod member 35.

[General Structure of an Active Vibration Reduction Device 11B According to a Second Embodiment of the Present Invention]

Next, a general configuration of the active vibration reduction device 11B according to the second embodiment of the present invention will be described with reference to FIGS. 8A and 8B.

Figure 8A:
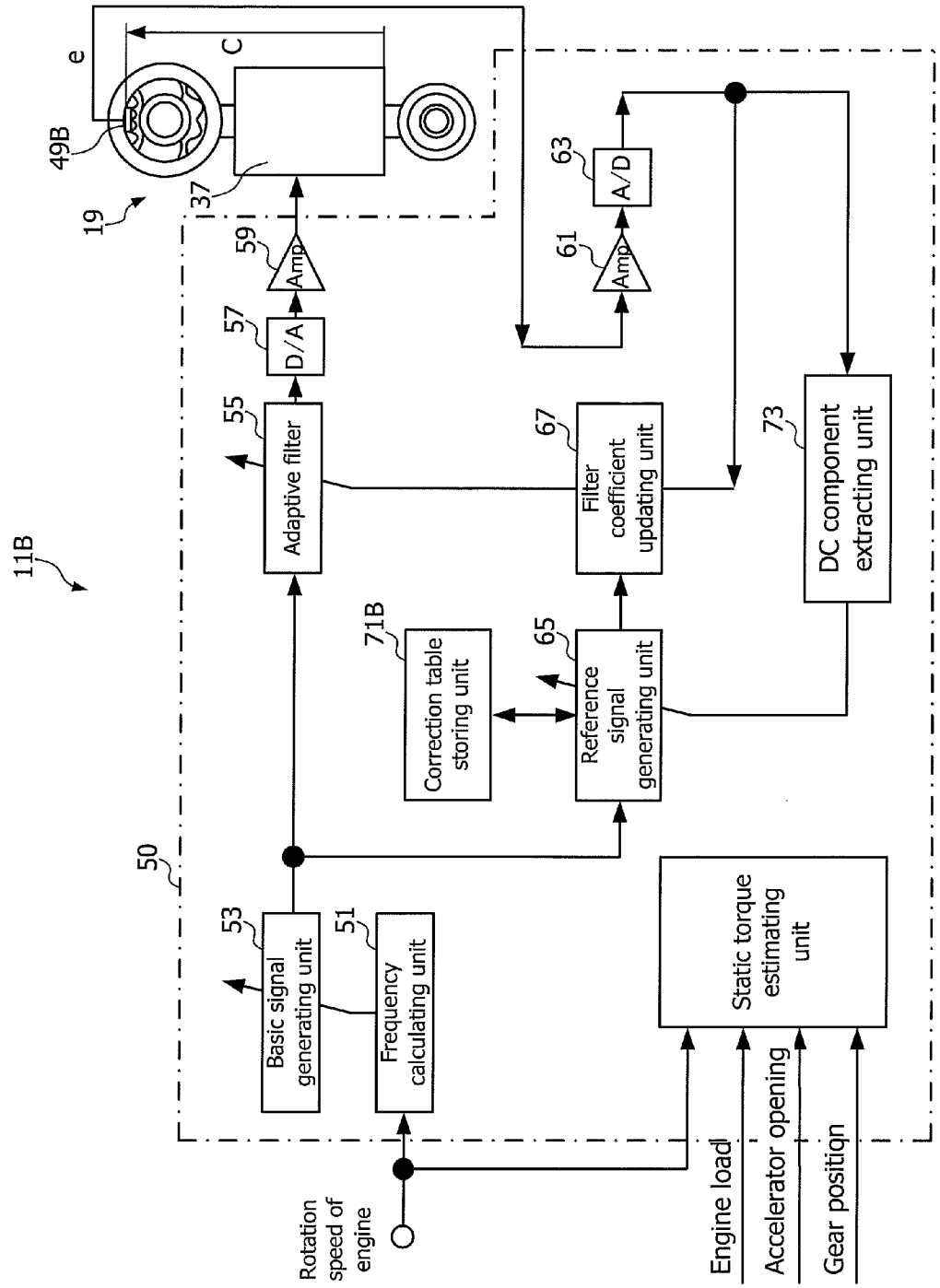
FIG. 8A is a block diagram illustrating a general configuration of the active vibration reduction device according to a second embodiment of the present invention.

FIG. 8A is a block diagram illustrating a general configuration of the active vibration reduction device 11B according to the second embodiment of the present invention. FIG. 8B is a block diagram illustrating an internal configuration of the active vibration reduction device according to the second embodiment of the present invention. FIG. 9 is an explanatory drawing illustrating a three-dimensional correction table stored in the correction table storing unit of the second embodiment.

Figure 8B:
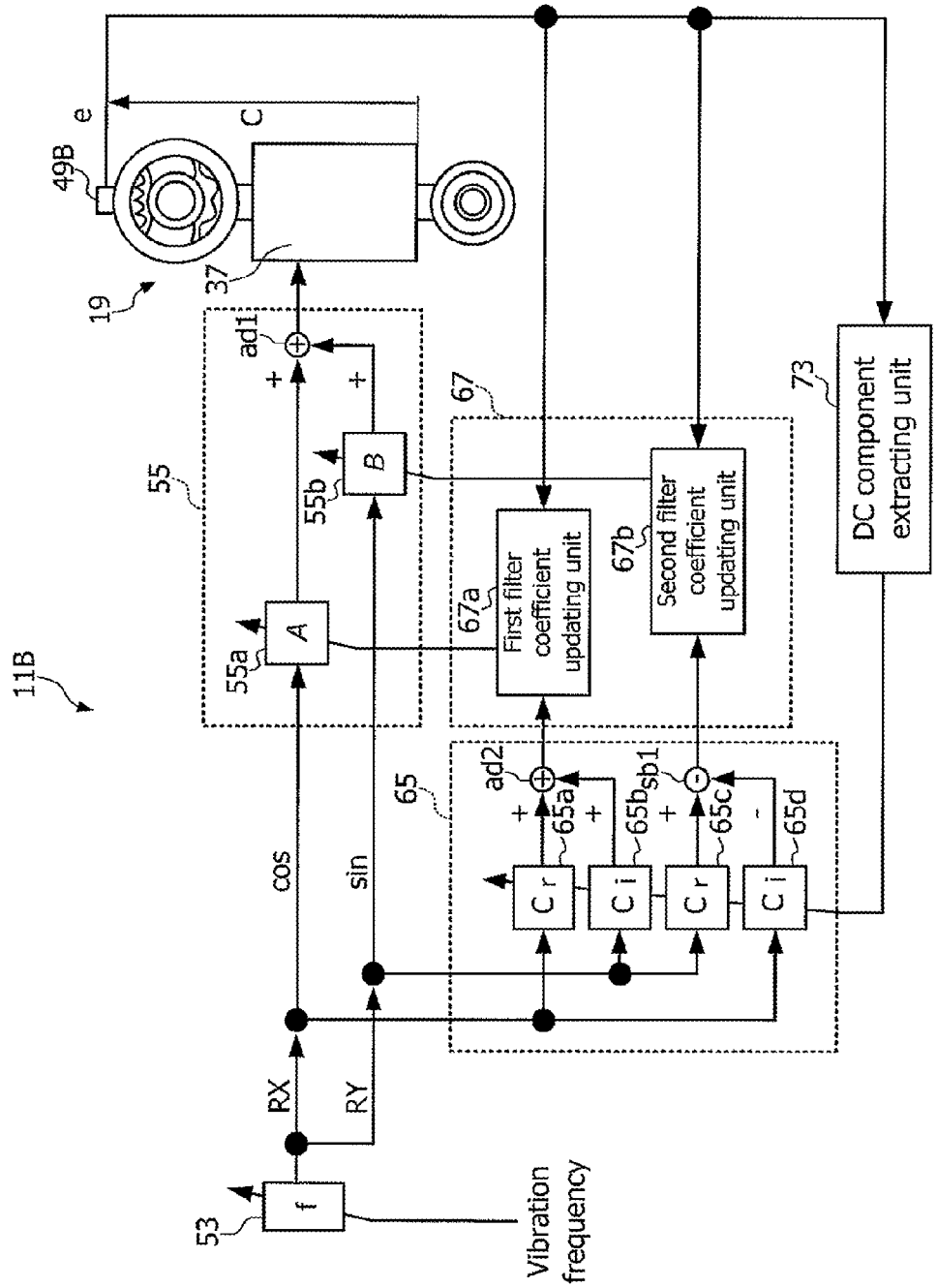
FIG. 8B is a block diagram illustrating an internal configuration of the active vibration reduction device according to the second embodiment of the present invention.
Figure 9:
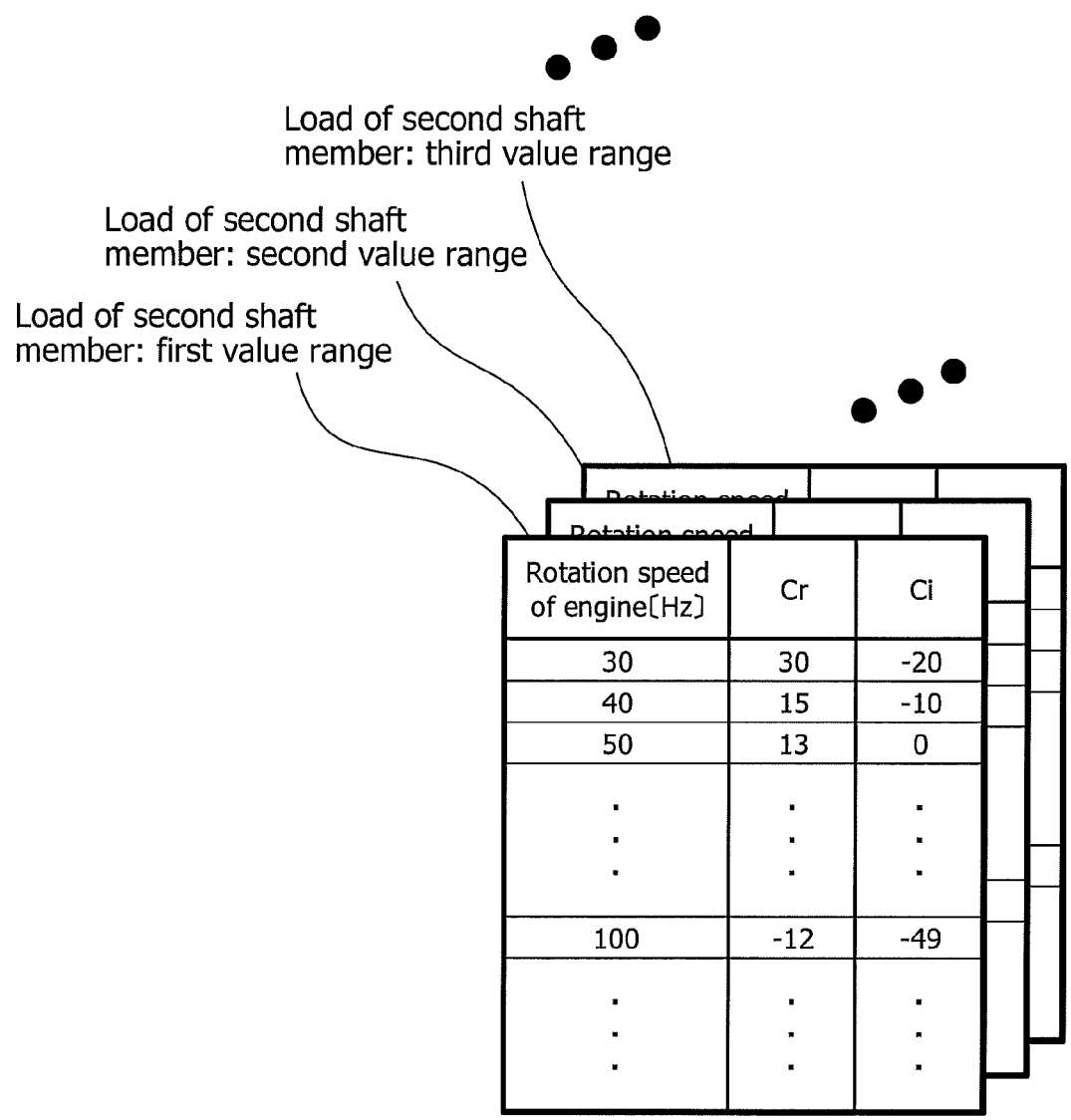
FIG. 9 is an explanatory drawing illustrating a three-dimensional correction table stored in the correction table storing unit of the second embodiment.

In FIG. 8B, to provide easy understanding in drawings, the frequency calculating unit 51, descriptions about the D/A converting unit 57, the signal amplifying unit 59, the signal amplifying unit 61, the A/D converting unit 63, and the correction table storing unit 71B are omitted.

The active vibration reduction device 11B according to the second embodiment has basic structural elements which are common to the active vibration reduction device 11A according to the first embodiment. Only a difference part between the first and second embodiments is described in place of the whole description about the active vibration reduction device 11B.

The active vibration reduction device 11B according to the second embodiment provides an adaptive control function which is preferable, for example, in the case of a vehicle in such a circumference that the rotation speed information and load information of the engine 13 for estimating the static torque of the engine 13 cannot be obtained and the case in which it is necessary to introduce the active vibration reduction device 11 at a low cost.

More specifically, in the active vibration reduction device 11B according to the second embodiment, as shown in FIGS. 8A and 8B, the static torque estimating unit 69, included in the active vibration reduction device 11A is omitted. Instead, in the active vibration reduction device 11B according to the second embodiment, as shown in FIGS. 8A and 8B, a DC component extracting unit 73 is provided which extracts a DC (direct current) component from the error signal e. Further, in place of the acceleration sensor 49A included in the active vibration reduction device 11A according to the first embodiment, an active vibration reduction device 11B includes a load detection sensor 49B (error signal detecting unit) for detecting a load of the second shaft member 33b on the first and second stoppers 33d1 and the 33b.

Further, the correction table storing unit 71B has a function for storing the correction tables for simulated vibration transmission characteristics, each corresponding to the plurality of value regions of vibration frequencies with association with a plurality of different value regions of loads of the second shaft member 33b on the stoppers 33d1, 33d2 as shown in FIG. 9.

[Operation of the Active Vibration Reduction Device 11B Regarding the Second Embodiment of the Present Invention]

Next, an operation of the active vibration reduction device 11B according to the second embodiment of the present invention will be described.

The frequency calculating unit 51 calculates the vibration frequency on the basis of the rotation speed information of the engine 13, similar to the active vibration reduction device 11A according to the first embodiment. The basic signal generating unit 53 generates the cosine wave signal RX and the sine wave signal RY as basic signals correlating with the vibration frequencies calculated by the frequency calculating unit 51.

The adaptive filter 55 generates the third control signal (A×RX)+(B×RY) for reducing the vibrations transmitted to the side of the vehicle body 21 from the engine 13 by performing the adaptive process for acting the filter coefficients A, B on the basic signals (the cosine wave signal RX and the sine wave signal RY) generated by the basic signal generating unit 53 similar to the active vibration reduction device 11A according to the first embodiment.

The third control signal (A×RX)+(B×RY), which is a digital signal generated by the adaptive filter 55, is converted into an analog signal by the D/A converting unit 57 similar to the active vibration reduction device 11A according to the first embodiment. After that, the third control signal is amplified to have a predetermined value of the gain and supplied to the offset vibration generating unit 37. In response to this, the offset vibration generating unit 37 generates the offset vibration based on the control signal at the inertia mass 41.

The load detection sensor 49B detects the error signal e which is an interference result of interference between the vibration of the engine 13 and the offset vibration generated by the offset vibration generating unit 37. The error signal e detected by the load detection sensor 49B is amplified to have a predetermined gain of the error signal by the signal amplifying unit 61 and then converted into a digital signal by the A/D converting unit 63 to be fed back to the filter coefficient updating unit 67 and sent to the DC component extracting unit 73. The DC component extracting unit 73 extracts a DC component included in the error signal e and information of the extracted DC component (load of the second shaft member 33b on the stoppers 33d1, 33d2) is supplied to the reference signal generating unit 65.

The reference signal generating unit 65 generates the reference signals using the information of the DC component (the load of the second shaft member 33b on the first stopper 33d1 or the second stopper 33d2), the stored content of the correction table storing unit 71A, and the simulated vibration transmission characteristic C^ obtained based on the vibration frequency. More specifically, the reference signal generating unit 65 generates the reference signals (the fifth reference signal (Cr×RX)+(Ci×RY), and the sixth reference signal (Cr×RY)−(Ci×RX)) obtained by correcting the basic signals Rx, Ry similar to the active vibration reduction device 11A according to the first embodiment.

The filter coefficient updating unit 67 updates the filter coefficients A, B of the adaptive filter 55 on the basis of the error signal e detected by the load detection sensor 49B and the reference signals (the fifth reference signal (Cr×RX)+(Ci×RY), and the sixth reference signal (Cr×RY)−(Ci×RX)). More specifically, the filter coefficient updating unit 67 uses the reference signal after correction by the reference signal generating unit 65 and updates the filter coefficient of the adaptive filter 55 on the basis of the calculation formula of the LMS (Least Mean Square) which is an adaptive control algorism for performing an adaptive process to minimize the error signal e.

[Operational Effect of the Active Vibration Reduction Device 11B According to the Second Embodiment of the Present Invention]

In the active vibration reduction device 11B, the static torque estimating unit 69 included in the active vibration reducing device 11A according to the first embodiment is omitted. Instead, the active vibration reduction device 11B according to the second embodiment includes the DC component extracting unit 73 for extracting DC (direct current) component from the error signal. Further, instead of the acceleration sensor 49A which the active vibration reduction device 11A according to the first embodiment includes, the active vibration reduction device 11B according to the second embodiment includes the load detection sensor 49B for detecting the load of the first stopper 33d1 or the second stopper 33d2.

Accordingly, the active vibration reduction device 11B according to the second embodiment provides an adaptive control function which is preferable, for example, in the case of a vehicle in such a circumference that the rotation speed information and load information of the engine 13 for estimating the static torque of the engine 13 cannot be obtained and the case in which it is necessary to introduce the active vibration reduction device 11 at a low cost.

[General Configuration of an Active Vibration Reduction Device 11C According to a Third Embodiment of the Present Invention]

Next, a general configuration of the active vibration reduction device 11C according to the third embodiment of the present invention will be described with reference to FIGS. 10A and 10B.

Figure 10A:
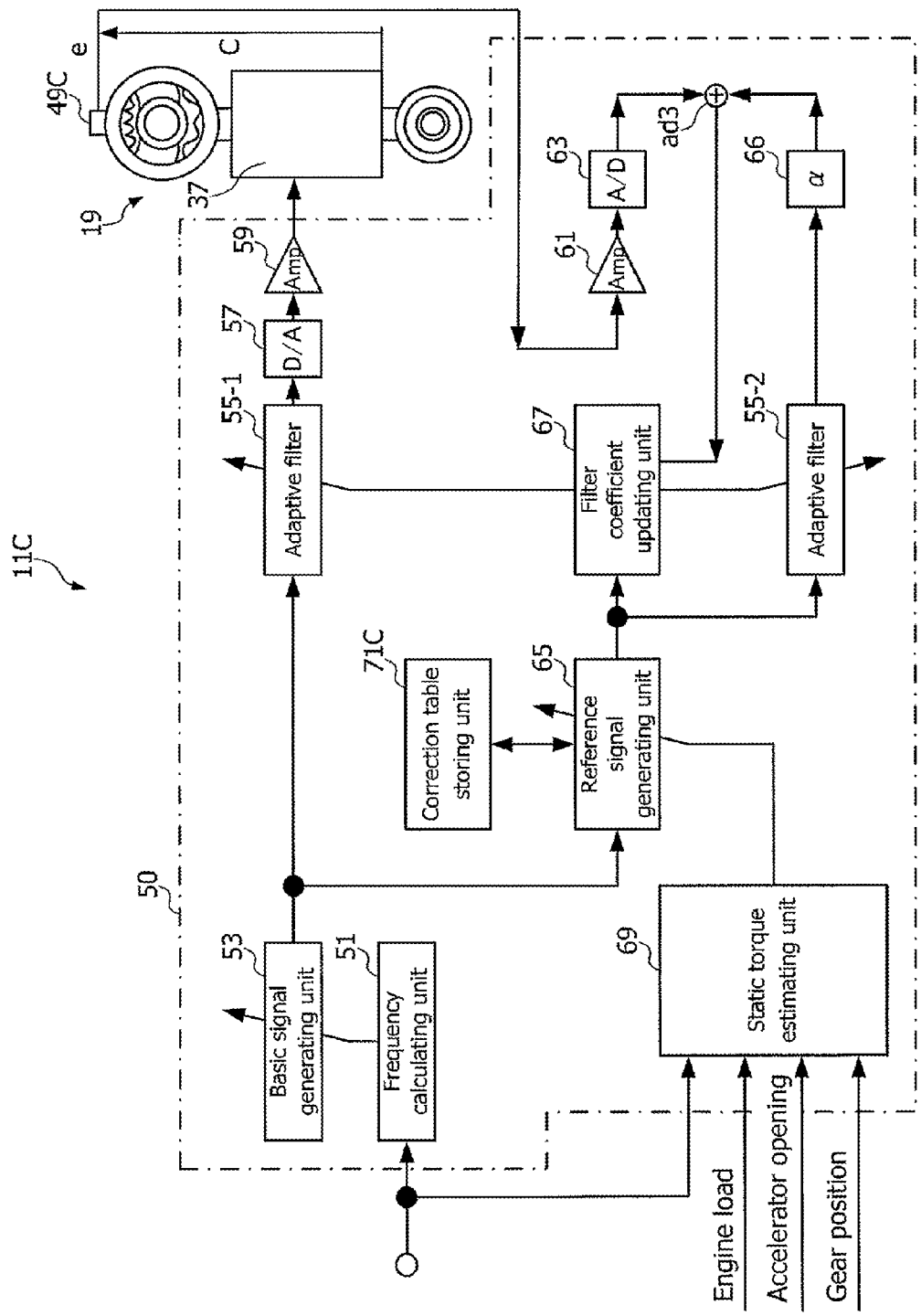
FIG. 10A is a block diagram representing a general configuration of the active vibration reduction device according to a third embodiment.

FIG. 10A is a block diagram representing a general configuration of the active vibration reduction device 11C according to a third embodiment of the present invention.

Figure 10B:
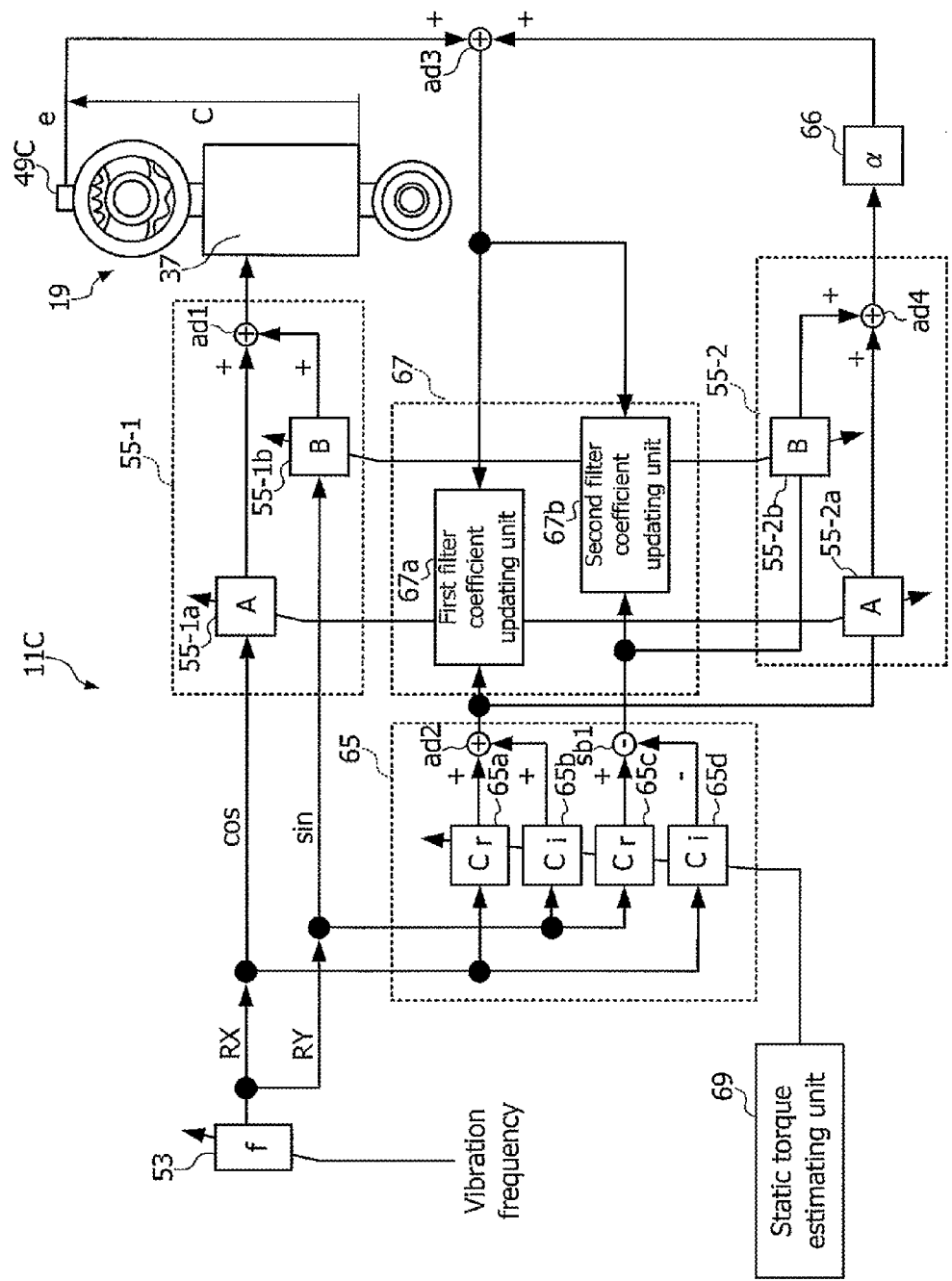
FIG. 10B is a block diagram illustrating an internal configuration in the active vibration reduction device according to the third embodiment of the present invention.

FIG. 10B is a block diagram illustrating an internal configuration in the active vibration reduction device according to the third embodiment of the present invention.

In FIG. 10B, out of a plurality of functional units that the active vibration reduction device 11C has, descriptions about the frequency calculating unit 51, the D/A converting unit 57, the signal amplifying unit 59, the signal amplifying unit 61, the A/D converting unit 63, and the correction table storing unit 71A are omitted.

The active vibration reduction device 11C according to the third embodiment has basic structural elements which are common to the active vibration reduction device 11A according to the first embodiment. Accordingly, only a difference part between the first and third embodiments is described in place of the whole description about the active vibration reduction device 11C.

The active vibration reduction device 11C according to the third embodiment provides an adaptive control function which is preferable for use aiming earlier stabilization of the offset vibration.

More specifically, the active vibration reduction device 11A according to the first embodiment includes a pair of the adaptive filters 55. On the other hand, the active vibration reduction device 11C according to the third embodiment includes, as shown in FIGS. 10A and 10B, an adaptive filter 55-2 (having a function which is common to the adaptive filter 55 according to the first embodiment) in addition to the adaptive filter 55-1 having the function which is substantially common to the adaptive filter 55 according to the first embodiment.

An adaptive filter 55-1 includes, as shown in FIG. 10B, a 1-1th adaptive filter 55-1a having the filter coefficient A, a 2-1th adaptive filter 55-1b having a filter coefficient B, and the adder unit ad1 The 1-1th adaptive filter 55-1a has a function for inputting the cosine wave signal RX out of the basic signals generated by the basic signal generating unit 53 and outputting the first control signal (A×RX) obtained by multiplying the cosine wave signal RX by the filter coefficient A. The 2-1th adaptive filter 55-1b has a function for inputting the sine wave signal RY out of the basic signals generated by the basic signal generating unit 53 and outputting the second control signal (B×RY) obtained by multiplying the sine wave signal RY by the filter coefficient B. The adder unit ad1 has a function for outputting the third control signal (A×RX)+(B× RY) obtained by adding the first control signal (A×RX) and a second control signal (B×RY).

A adaptive filter 55-2 includes, as shown in FIG. 10B, the 1-2th adaptive filter 55-2a having the filter coefficient A and an adaptive filter 55-2b having the filter coefficient B, and an adder unit ad4. The 1-2th adaptive filter 55-2a has a function for inputting the fifth reference signal (Cr×RX)+(Ci×RY) generated by the reference signal generating unit 65 and outputting a seventh control signal A×{(Cr×RX)+(Ci×RY)} obtained by multiplying the fifth reference signal by the filter coefficient A. The 2-2th adaptive filter 55-2b has a function for inputting a sixth reference signal (Cr×RY)−(Ci×RX) generated by the reference signal generating unit 65 and outputting an eighth control signal B×{(Cr×RY)−(Ci×RX)} obtained by multiplying the sixth reference signal by the filter coefficient B. The adder unit ad4 has a function for outputting a ninth control signal obtained by adding the seventh control signal described above and the eighth control signal described above.

Further, the active vibration reduction device 11C according to the third embodiment includes, as shown in FIGS. 10A and 10B, the coefficient multiplying unit 66 for inputting the ninth control signal output by the adaptive filter 55-2 and outputting a tenth control signal derived by multiplying the ninth control signal by a predetermined stabilizing coefficient α, and an adder unit ad3 for adding the tenth control signal from the coefficient multiplying unit 66 and the error signal e.

A correction table storing unit 71C according to the third embedment is the same as the correction table storing unit 71A according to the first embodiment. More specifically, the correction table storing unit 71C according to the third embodiment has a function for storing the correction tables for simulated vibration transmission characteristics, each corresponding to the plurality of value regions of vibration frequencies with association with a plurality of different value regions of the static torque of the engine 13.

[Operation of the Active Vibration Reduction Device 11C According to the Third Embodiment of the Present Invention]

Next, an operation of the active vibration reduction device 11C according to the third embodiment of the present invention will be described.

The frequency calculating unit 51 calculates the vibration frequency on the basis of the rotation speed information of the engine 13, similar to the active vibration reduction device 11A according to the first embodiment. The basic signal generating unit 53 generates the cosine wave signal RX and the sine wave signal RY as the basic signals correlating with the vibration frequencies calculated by the frequency calculating unit 51.

The adaptive filter 55-1 generates the third control signal (A×RX)+(B×RY) for reducing the vibrations transmitted to the side of the vehicle body 21 from the engine 13 by performing the adaptive process for acting the filter coefficients A, B on the basic signals (the cosine wave signal RX and the sine wave signal RY) generated by the basic signal generating unit 53 similar to the active vibration reduction device 11A according to the first embodiment.

The third control signal (A×RX)+(B×RY), which is a digital signal generated by the adaptive filter 55, is converted into an analog signal by the D/A converting unit 57 similar to the active vibration reduction device 11A according to the first embodiment. After that, the third control signal is amplified to have a predetermined value of the gain and supplied to the offset vibration generating unit 37. In response to this, the offset vibration generating unit 37 generates the offset vibration based on the control signal at the inertia mass 41.

An acceleration sensor 49C detects the error signal e which is an interference result of interference between the vibrations of the engine 13 and the offset vibrations generated by the offset vibration generating unit 37. The error signal e detected by the acceleration sensor 49C is amplified to have a predetermined of the gain and then converted into a digital signal by the A/D converting unit 63 and supplied to the adder unit ad3 described later.

On the other hand, in the adaptive filter 55-2 inputs, as shown in FIG. 10B, the fifth reference signal (Cr×RX)+(Ci×RY) generated by the reference signal generating unit 65 and outputs a seventh control signal A×{(Cr×RX)+(Ci×RY)} obtained by multiplying the fifth reference signal by the filter coefficient A. The 2-2th adaptive filter 55-2b inputs the sixth reference signal (Cr×RY)−(Ci×RX) generated by the reference signal generating unit 65 and outputs the eighth control signal B×{(Cr×RY)−(Ci×RX)} obtained by multiplying the sixth reference signal by the filter coefficient B. The adder unit ad4 outputs a ninth control signal obtained by adding the seventh control signal described above and the eighth control signal described above. Accordingly, the ninth control described above is outputted by the adaptive filter 55-2.

The coefficient multiplying unit 66 inputs, as shown in FIG. 10B, the ninth control signal outputted by the adaptive filter 55-2 and outputs a tenth control signal which is corrected by multiplying the ninth control signal by a predetermined stabilizing coefficient α.

The adder unit ad3 adds the tenth control signal from the coefficient multiplying unit 66 and the error signal e to output the result. The output of the adder unit ad3 is fed back to the filter coefficient updating unit 67.

The reference signal generating unit 65 generates, similar to the active vibration reduction device 11A according to the first embodiment, generates the reference signals using the static torque of the engine 13 estimated by the static torque estimating unit 69, the storing content of the correction table storing unit 71C and the simulated vibration transmission characteristic C^ obtained on the basis of the vibration frequency. More specifically, the reference signal generating unit 65 generates the reference signals obtained by correcting the basic signals RX, RY on the basis of the simulated vibration transmission characteristic C^ obtained by the above-described process.

The filter coefficient updating unit 67 updates the filter coefficients A, B of the adaptive filter 55 on the basis of an output of the adder unit ad3 obtained by adding the tenth control signal of the coefficient multiplying unit 66 and an output of the adder unit ad3 obtained by adding the error signal e detected by the load detection sensor 49B and the reference signals (the fifth reference signal (Cr×RX)+(Ci×RY), and the sixth reference signal (Cr×RY)−(Ci×RX)). More specifically, the filter coefficient updating unit 67 uses the fifth reference signal and the sixth reference signal after correction at the reference signal generating unit 65 and updates the filter coefficients A, B of the adaptive filter 55 on the basis of the calculation formula of LMS, which is an adaptive control algorism to make the added value of the tenth control signal of the coefficient multiplying unit 66 and the error signal e smallest.

[Operational effect of the active vibration reduction device 11C according to a third embodiment]

The active vibration reduction device 11C according to the third embodiment of the present invention includes the coefficient multiplying unit 66 for inputting the ninth control signal outputted by the adaptive filter 55-2 and outputting the tenth control signal corrected by multiplying the ninth control signal by a predetermined stabilizing coefficient α and the adder unit ad3 for adding the tenth control signal from the coefficient multiplying unit 66 and the error signal e.

The filter coefficient updating unit 67 uses the fifth control signal and the sixth control signal after correction by the reference signal generating unit 65 and updates the filter coefficients A, B of the adaptive filter 55 by performing an adaptive process to minimize the value obtained by adding the tenth control signal from the coefficient multiplying unit 66 and the error signal e.

In the active vibration reduction device 11C according to the third embodiment of the present invention, an approach is adopted in which the value of the stabilizing coefficient α ($0 < \alpha < 1$) is increased gradually from "0", so that an earlier stabilization (optimization) of the offset vibration can be surely performed.

[Other Embodiments]

The above-described embodiments are examples of the present invention. Accordingly, the technical region of the present invention should not be interpreted restrictively from the examples. The present invention can be embodied in various modes without departure from the subject of the present invention.

For example, in the explanation of the embodiments of the present invention, the linear actuator 47 is exemplified as the offset vibration generating unit 37. However, the present invention is not limited to these embodiments. Any configuration of the offset vibration generating unit 37 is applicable as long as the inertia mass 41 is driven to be swung along the axial direction of the rod member 35.

Further, embodiments of the present invention have been described with the inertia mass 41 having an exterior shape of cylindrical column shape are exemplified but the present invention is no limited to this. Any exterior shape of the inertia mass 41 can be adopted as long as the function of exterior driven with swing drive along the axial direction of the rod member 35.

In the embodiments describe above, a difference between the vibrations of the engine 13 and the offset vibrations generated by the offset vibration generating unit 37 is called the "error". Here, the "error" is generally defined as a magnitude of deviation from the expected value. When the general concept of "error" is applied to the present invention, the expected value corresponds to the ideal status in which there is no vibration and the magnitude of deviation from the expected value corresponding to the difference between the actual vibration of the engine 13 and the offset vibration generated by the offset vibration generating unit 37 (actual vibrations).

DESCRIPTION OF REFERENCE SYMBOLS 11A active vibration reduction device according to the first embodiment of the present invention
11B active vibration reduction device according to the second embodiment of the present invention
11C active vibration reduction device according to the third embodiment of the present invention
13 engine
15 transmission
17 power plant
19 torque rod
21 vehicle body
23 roll axis of inertia main axis
25a, 25a a pair of mounting units
31 first insulator
31a first hollow cylindrical member
31b first shaft member 31c first space
31c1 first elastic member
33 second insulator
33a second hollow cylindrical member
33b second shaft member
33c a second space
33c1 second elastic member
33d1, 33d2 first and second stoppers
35 rod part
35a outer circumferential wall unit
35b circumference channel
37 offset vibration generating unit
40 main body
41 inertia mass
41a inner circumferential wall member
41b, 43b both end parts
43a, 43b ball bearing unit
45 elastic member
47 linear actuator
49A acceleration sensor (error signal detecting unit)
49B load detection sensor (error signal detecting unit)
49C acceleration sensor (error signal detecting unit)
50 microcomputer
51 frequency calculating unit
53 basic signal generating unit
55 adaptive filter (control signal generating unit)
57 D/A converting unit
59 signal amplifying unit
61 signal amplifying unit
63 A/D converting unit
65 reference signal generating unit
67 filter coefficient updating unit
69 static torque estimating unit
71A, 71B, 71C correction table storing unit
73 DC component extracting unit

The invention claimed is:

1. An active vibration reduction device reducing vibrations from the engine to a side of a vehicle body, comprising:
a torque rod elastically supporting an engine relative to the side of the vehicle body, the torque rod including a pair of insulators and a rod part; and
an inertial mass supported movably reciprocatively relative to the rod part along an axial direction of the rod part;
wherein the pair of the insulators include shaft members, disposed inside hollow cylindrical members, attached to a side of the engine and the side of the vehicle body, respectively, the shaft members being elastically supported by the hollow cylindrical members; and wherein
at least one of the pair of the insulators includes a stopper at an inner circumferential wall of the hollow cylindrical member, the stopper restricting a displacement of the shaft member in the axial direction of the rod part;
the active vibration reduction device further comprising:
a basic signal generating unit generating a basic signal correlating with a vibration frequency based on rotation speed information of the engine;
a control signal generating unit generating a control signal to reduce the vibrations transmitted to the side of the vehicle body from the engine by performing an adaptive process which causes a filter coefficient of an adaptive filter to act on the basic signal;
an offset vibration generating unit generating offset vibrations at the inertia mass based on the control signal;
an error signal detecting unit for detecting an error signal regarding an error between the vibrations of the engine and the offset vibrations;
a reference signal generating unit generating a reference signal obtained by correcting the basic signal on the basis of a simulated vibration transmission characteristic from the offset vibration generating unit to the error signal detecting unit;
a filter coefficient updating unit updating the filter coefficient of the adaptive filter on the basis of the error signal and the reference signal;
a static torque estimating unit estimating a static torque of the engine on the basis of the rotational speed information and load information of the engine; and
a correction table storing unit storing correction tables of the simulated vibration transmission characteristics corresponding to a plurality of different value regions of the vibration frequencies with association with a plurality of different value regions of the static torque of the engine; wherein
the reference signal generating unit generates the reference signal using the simulated vibration transmission characteristic obtained on the basis of the static torque of the engine estimated by the static torque estimating unit, a stored content of the correction table storing unit, and the simulated vibration transmission characteristic obtained based on the vibration frequency.

2. An active vibration reduction device reducing vibrations from the engine to a side of a vehicle body, comprising:
a torque rod elastically supporting an engine relative to the side of the vehicle body, the torque rod including a pair of insulators and a rod part; and
an inertial mass supported movably reciprocatively relative to the rod part along an axial direction of the rod part; wherein
the pair of the insulators include shaft members, disposed inside hollow cylindrical members, attached to a side of the engine and the side of the vehicle body, respectively, the shaft members being elastically supported by the hollow cylindrical members; and wherein
at least one of the pair of the insulators includes a stopper at an inner circumferential wall of the hollow cylindrical member, the stopper restricting a displacement of the shaft member in the axial direction of the rod part;
the active vibration reduction device further comprising:
a basic signal generating unit generating a basic signal correlating with a vibration frequency based on rotation speed information of the engine;
a control signal generating unit generating a control signal to reduce the vibrations transmitted to the side of the vehicle body from the engine by performing an adaptive process which causes a filter coefficient of an adaptive filter to act on the basic signal;
an offset vibration generating unit generating offset vibrations at the inertia mass based on the control signal;
an error signal detecting unit for detecting an error signal regarding an error between the vibrations of the engine and the offset vibrations;
a reference signal generating unit generating a reference signal obtained by correcting the basic signal on the basis of a simulated vibration transmission characteristic from the offset vibration generating unit to the error signal detecting unit;
a filter coefficient updating unit updating the filter coefficient of the adaptive filter on the basis of the error signal and the reference signal;
a correction table storing unit storing correction tables of the simulated vibration transmission characteristics corresponding to a plurality of different value regions of the vibration frequencies with association with a plurality of different value regions of the load of the shaft member on the stopper; wherein the stopper includes a load detecting unit for detecting a load of the shaft member on the stopper; and wherein the reference signal generating unit generates the reference signal using the load of the shaft member on the stopper detected by the load detecting unit, a stored content of the correction table storing unit, and the simulated vibration transmission characteristic obtained based on the vibration frequency.

3. The active vibration reduction device as claimed in claim 1, wherein the inertia mass is supported movably reciprocatively relative to the rod part along the axial direction of the rod part using a ball bearing mechanism intervening between the inertia mass and the rod part.

4. The active vibration reduction device as claimed in claim 2, wherein the inertia mass is supported movably reciprocatively relative to the rod part along the axial direction of the rod part using a ball bearing mechanism intervening between the inertia mass and the rod part.

* * * * *